(12) United States Patent
Kazama et al.

(10) Patent No.: US 7,957,613 B2
(45) Date of Patent: Jun. 7, 2011

(54) AUTOMATIC ORIGINAL FEEDING DEVICE, AND IMAGE READER AND IMAGE FORMING APPARATUS USING AUTOMATIC ORIGINAL FEEDING DEVICE

(75) Inventors: Hiroatsu Kazama, Kanagawa (JP); Daisuke Imada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1478 days.

(21) Appl. No.: 11/384,863

(22) Filed: Mar. 21, 2006

(65) Prior Publication Data

US 2007/0070451 A1 Mar. 29, 2007

(30) Foreign Application Priority Data

Sep. 15, 2005 (JP) ................................ P2005-267781

(51) Int. Cl.
*G06K 9/20* (2006.01)
*H04N 1/04* (2006.01)
(52) U.S. Cl. ........................................ 382/312; 358/498
(58) Field of Classification Search .................. 382/112, 382/162, 312; 358/1.15, 474, 498; 250/559.1, 250/559.29, 559.37
See application file for complete search history.

(56) References Cited

U.S. PATENT DOCUMENTS

| | | | |
|---|---|---|---|
| 4,875,104 A | 10/1989 | Kamon | |
| 5,895,928 A * | 4/1999 | Kerschner | 250/559.37 |
| 6,484,041 B1 | 11/2002 | Aho et al. | |
| 2001/0028475 A1 | 10/2001 | Shibahara et al. | |
| 2005/0185227 A1* | 8/2005 | Thompson | 358/474 |
| 2006/0001919 A1* | 1/2006 | Owens et al. | 358/498 |

FOREIGN PATENT DOCUMENTS

| | | |
|---|---|---|
| JP | 62-293879 | 12/1987 |
| JP | A-5-328052 | 10/1993 |
| JP | A-7-148969 | 6/1995 |
| JP | 2502591 | 3/1996 |
| JP | 2706711 | 10/1997 |
| JP | 2000-112544 | 4/2000 |
| JP | 2001-167271 | 6/2001 |
| JP | 2001-298588 | 10/2001 |
| JP | 2003-348301 | 12/2003 |
| JP | 2004-193738 | 7/2004 |
| JP | 2004-262584 | 9/2004 |
| JP | A-2005-112544 | 4/2005 |

* cited by examiner

*Primary Examiner* — Duy M Dang
(74) *Attorney, Agent, or Firm* — Morgan, Lewis & Bockius LLP

(57) ABSTRACT

An automatic original feeding device includes an original paper feed tray that loads an original to read the image, the original paper feed tray being supported on an upper face of a platen glass for an image reader that reads an image of the original passing through an original reading position set along a straight line on the upper face of the platen glass disposed at an upper end; an original paper output tray, original feeding members feeding sequentially the original laid on the original paper feed tray to the original reading position and the original paper output tray and a strip sheet attaching part attaching detachably a strip colored sheet, the strip sheet attaching part provided in a back platen member disposed in a portion opposed to the original reading position under the condition that the sheet attaching part is supported on the upper face of the platen glass.

18 Claims, 8 Drawing Sheets

MAIN FLOWCHART FOR A PROCESS FOR MEASURING THE MISREGISTRATION AND SO ON IN THE IIT CONTROLLER

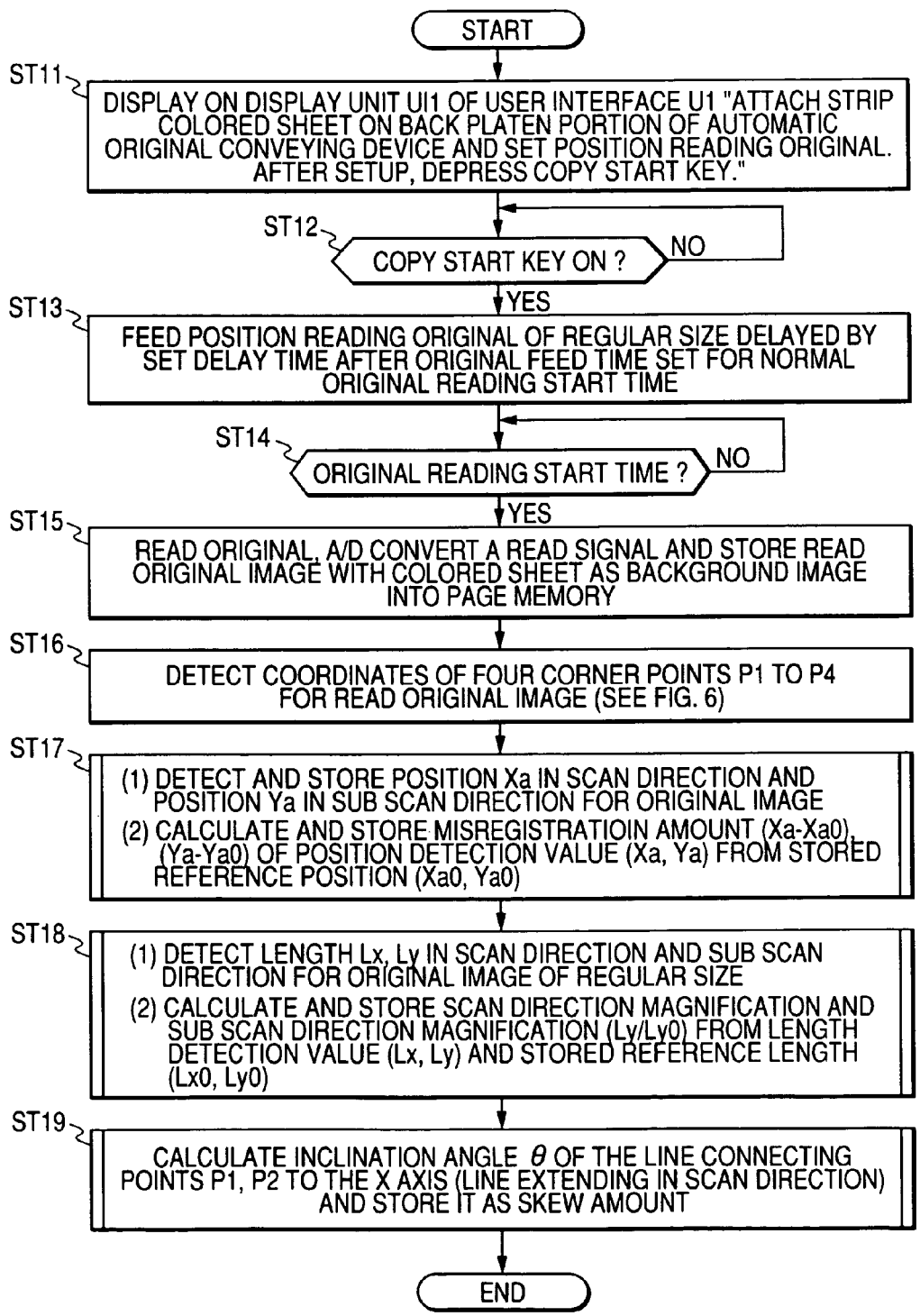

AUTOMATIC ORIGINAL FEEDING DEVICE, AND IMAGE READER AND IMAGE FORMING APPARATUS USING AUTOMATIC ORIGINAL FEEDING DEVICE

BACKGROUND

1. Technical Field

The present invention relates to an automatic original feeding device for use in an image reader such as an image scanner and an IIT (Image Input Terminal) and an image forming apparatus such as a copying machine, a FAX and a composite machine, and an image reader and an image forming apparatus using the automatic original feeding device, and more particularly, to an automatic original feeding device supported on the upper face of a platen glass of an image reader for reading an image of the original passing through the original reading position set along a straight line on the upper face of the platen glass disposed at the upper end and feeding the original to pass through an original reading position, and an image reader and an image forming apparatus using the automatic original feeding device.

2. Related Art (Misregistration in Scan Direction)

The position of an original in the scan direction when the original fed by the automatic original feeding device passes through an original reading position is controlled to become a preset reference position in the scan direction. If the position of the original in the scan direction in passing through the original reading position is deviated from the preset reference position in the scan direction, the position of an original image read by the image reader in the scan direction is deviated. In this case, if the original image is formed on an image recording paper without correcting the position of the original image which is read with a misregistration in the scan direction, the position of a copied image for the original formed on the image recording paper is deviated from the scheduled position in the scan direction.

Accordingly, a technology for measuring the amount of deviation of the position of the original in the scan direction (amount of misregistration in the scan direction) in passing through the original reading position from the preset reference position in the scan direction is so far well known, in which the position of the image on the image recording paper in the scan direction is adjusted according to measurements of the amount of misregistration in the scan direction.

(Misregistration in Sub Scan Direction)

Also, the position of a read image of the original in the sub scan direction is defined depending on an image reading start time of the original passing through the original reading position and an original former edge passage time at which the former edge of the original passes through the original reading position. Accordingly, the position of the read image for the original in the sub scan direction is controlled by adjusting the original former edge passage time with respect to the image reading start time. If the position of the read image for the original in the sub scan direction is deviated from the preset reference position in the sub scan direction, the position of the original image formed on the image recording paper is deviated from the scheduled position in the sub scan direction, when the original image is formed on the image recording paper without correcting the position of the original image read with a misregistration in the sub scan direction.

Accordingly, a technology for measuring the amount of deviation of the position of the original in the sub scan direction (amount of misregistration in the sub scan direction) in passing through the original reading position from the preset reference position in the sub scan direction is so far well known, in which the position of the image on the image recording sheet in the sub scan direction is adjusted according to measurements of the amount of misregistration in the sub scan direction.

(Original Size Magnification (Scan Direction Magnification and Sub Scan Direction Magnification))

The originals of regular sizes such as B5, B4, A4 and A3 are employed in most cases. However, when the image at equal magnification of the original image is formed on the recording paper, the recording paper of regular size such as B5, B4, A4 or A3 is used. In this case, where the original of A4 size is used, the recording paper of A4 size is employed. Though the reference value of regular A4 size is set, the size of A4 original actually used may change due to a size error occurring by cutting it into the A4 size, or depending on the temperature and humidity, and may be different from the reference value in some cases. Accordingly, there is a size error between the original of A4 size and the recording paper of A4 size. For instance, when the size of the A4 original is larger than the reference value of regular A4 size, and the size of the A4 recording paper is smaller, the size of the original and the size of the recording paper may be considerably greatly different. In this case, the position and the size of the image formed on the recording paper will shift when the copy image of the original image is formed on the recording paper without adjusting the size and the position of the read original image.

Accordingly, a technology for measuring the magnification in the scan direction length and the sub scan direction length (scan direction magnification and sub scan direction magnification) of the original in passing through the original reading position with respect to the preset reference value is so far well known, in which the magnifications of the image on the image recording paper in the scan direction and the sub scan direction are adjusted according to measurements of the magnification.

(Skew)

In most cases, the original is stopped temporarily at an original registration roll disposed on the upstream side of the original reading position in the original feeding direction, to form a loop at the former edge of the original, and then is fed to the original reading position. In this case, the amount of original skew is generally small, where there is no problem. However, when the axis of the original registration roll is inclined in a direction vertical to the original feeding direction due to some cause, the amount of original skew may become large. When the skew is large, the original image is inclined on the recording paper, if the read original image is directly formed on the recording paper, because the read original image is inclined.

Accordingly, a technology for measuring the amount of skew to know whether or not there is a large skew in the read image is so far well known.

When the amount of skew in the original is large, the inclination of the axis of the original registration roll may be adjusted by the service engineer, or automatically adjusted by providing a function of automatically adjusting the axis of the original registration roll.

Moreover, a technology for adjusting the skew by adjusting the inclination of a side guide (sheet guide for guiding one side of the recording sheet in the width direction) on the upstream side of the registration roll without forming a loop with the registration roll in a feeding device for the image recording sheet, but not the original registration roll, is so far well known.

Even if the automatic original feeding device employs the side guide, when the skew is large in the original image, the skew may be adjusted by calling the service engineer, or automatically adjusted by providing a function of automatically adjusting the inclination of the side guide in the automatic original feeding device.

Accordingly, if the misregistration of the copied image on the recording paper in the scan direction or sub scan direction, the original size magnification or the skew occurs due to the misregistration of the original image read at the reading position, the misregistration of the copied image on the recording paper is caused. To correct this misregistration, a technology for measuring the misregistration, the original size magnification or the skew is so far well known.

A technology for detecting and correcting the misregistration based on a difference between the detection position of the read image and the reference position stored in the memory by running the original having a test chart has been known.

A technology for detecting and correcting the misregistrations of the original at the original reading position in the scan direction and the sub scan direction by running the black original and sensing the original edge based on the contrast between a member opposed to the original reader and the black original has been known.

In the related arts described above, it is required to prepare the special original usually not provided, that is, an original having the test chart or the black original. Therefore, there is a problem because the special original must be prepared in practice though there is a feasibility.

SUMMARY

The present invention has been made in view of the above circumstances and provides an automatic original feeding device, and image reader and image forming apparatus using automatic original feeding device.

According to an aspect of the invention, an automatic original feeding device comprises: an original paper feed tray that loads an original to read the image, the original paper feed tray being supported on an upper face of a platen glass for an image reader that reads an image of the original passing through an original reading position set along a straight line on the upper face of the platen glass disposed at an upper end; an original paper output tray; original feeding members feeding sequentially the original laid on the original paper feed tray to the original reading position and the original paper output tray; and a strip sheet attaching part attaching detachably a strip colored sheet, the strip sheet attaching part provided in a back platen member disposed in a portion opposed to the original reading position under the condition that the sheet attaching part is supported on the upper face of the platen glass.

BRIEF DESCRIPTION OF THE DRAWINGS

Embodiment(s) of the present invention will be described in detail based on the following figures, wherein:

FIG. 8 is a flowchart of a process for measuring the misregistration (sub-routine of ST3 in FIG. 7);

DETAILED DESCRIPTION

Figure 1:
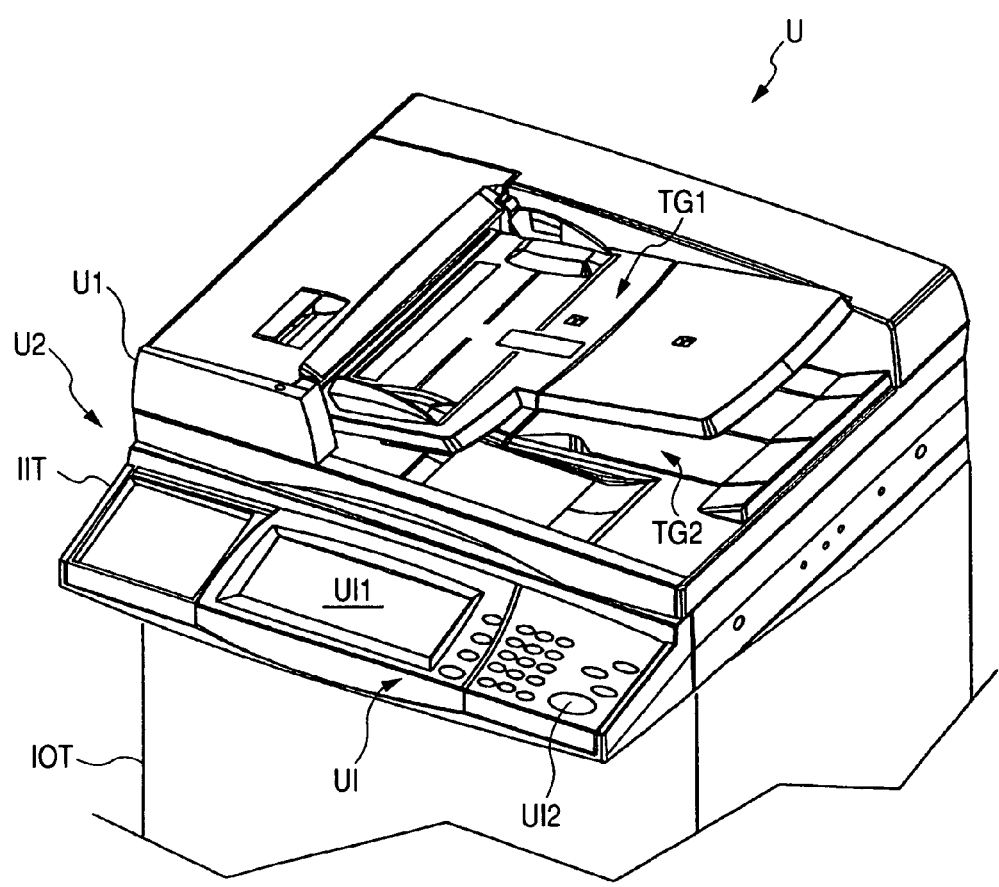
FIG. 1 is a perspective view of an image forming apparatus having a sheet feeding device according to a first embodiment of the invention.

The Embodiments (specific examples) of the present invention will be described below with reference to the drawings, but the invention is not limited to the following embodiments.

To facilitate the understanding of the following explanation, it is assumed in the drawings that the cross direction is the X axis direction, the longitudinal direction is the Y axis direction, and the vertical direction is the Z axis direction, and the direction or side as indicated by the arrow X, −X, Y, −Y, Z, or −Z is forward, backward, rightward, leftward, upward, or downward, in other words, fore side, back side, right side, left side, upper side or lower side.

In the drawings, a sign "●" within "O" section the arrow directed from the back to front of the paper, and a sign "X" within "O" section the arrow directed from the front to back of the paper.

First Embodiment

FIG. 1 is a perspective view of an image forming apparatus having a sheet feeding device according to a first embodiment of the invention.

Figure 2:
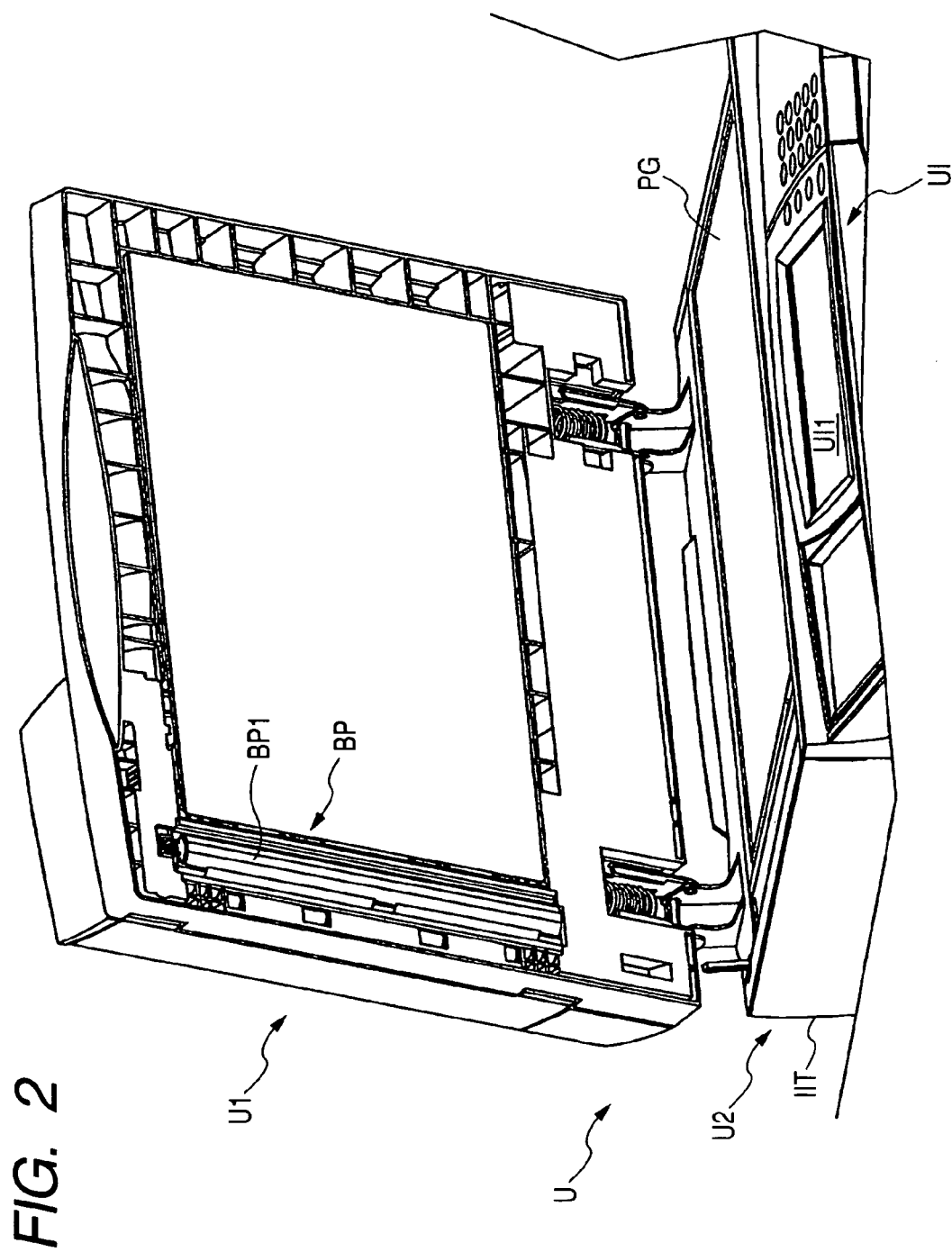
FIG. 2 is an upper perspective view of the image forming apparatus in a state where an automatic original feeding device is turned upward.

FIG. 2 is an upper perspective view of the image forming apparatus in a state where an automatic original feeding device is rotated upward.

Figure 3:
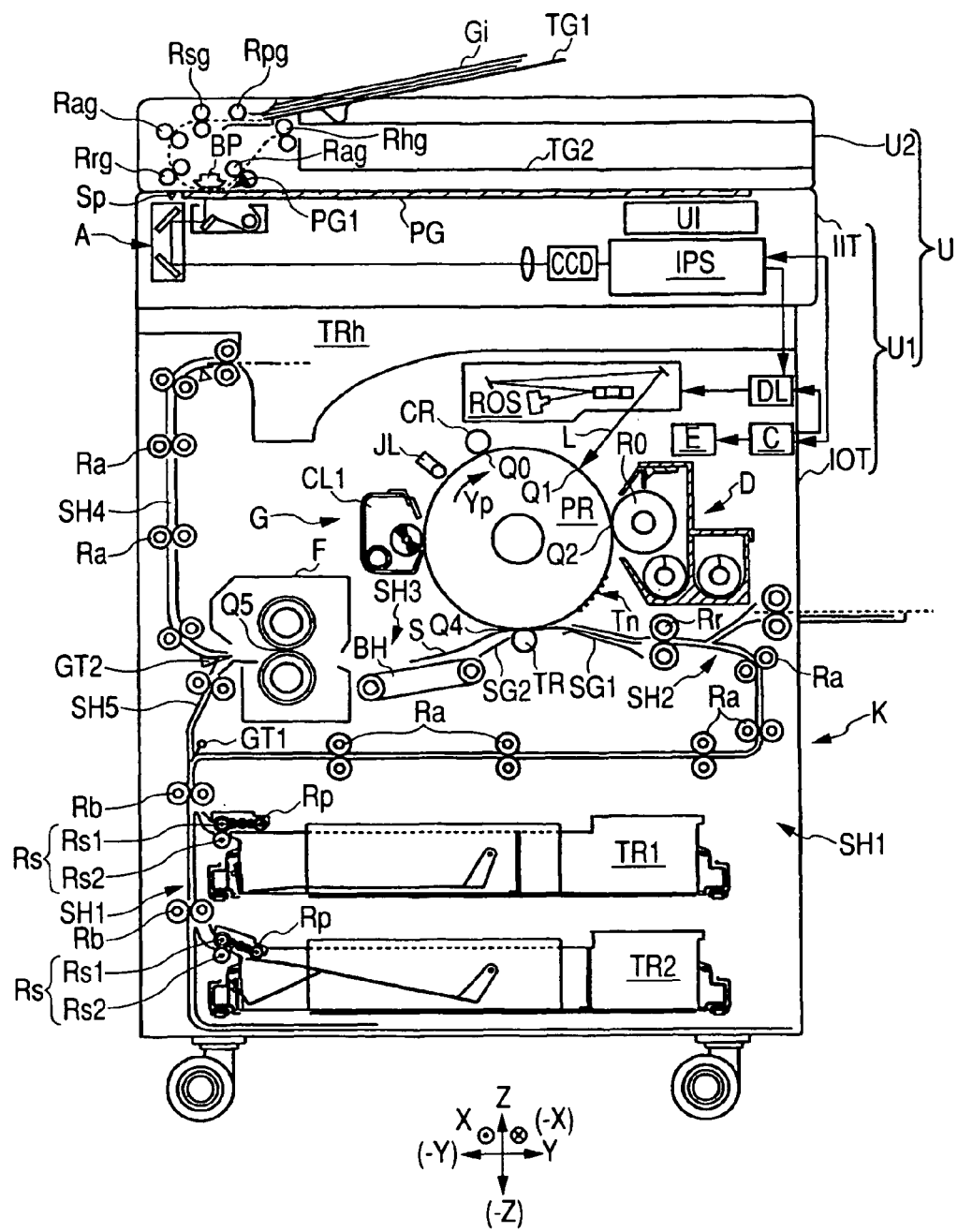
FIG. 3 is a longitudinal cross-sectional view of the image forming apparatus.

FIG. 3 is a longitudinal cross-sectional view of the image forming apparatus.

In FIG. 1, a digital copying machine (image forming apparatus) U comprises an automatic original feeding device (ADF, namely, automatic document feeder) U1, and a digital copying machine main body (image forming apparatus main body) U2 having a platen glass G supporting the automatic original feeding device at the upper end. The automatic original feeding device U1 is mounted demountably and rotatably upward (see FIG. 2) on an upper face of the platen glass PG.

In FIG. 3, the automatic original feeding device U1 has an original paper feed tray G1 on which plural originals Gi to be copied are laid. Each of plural originals Gi laid on the original paper feed tray TG1 is picked up by an original pickup roll Rpg, and fed to an original selvedge roll Rsg. When plural originals are fed, the original selvedge roll Rsg separates originals one by one to feed one original to the original feeding roll Rag on the downstream side. The original Gi fed on the downstream side of the original feeding roller Rag is once stopped by an original registration roller Rrg, and fed to an original reading position PG1 set on the platen glass PG at a predetermined timing.

The original Gi passing through the original reading position PG1 is exhausted into an original paper output tray TG2 by the original feeding roller Rag and an original exhausting roller Rhg.

A back platen member BP is disposed above the original reading position, and provided with a colored sheet attaching part BP1 for detachably attaching a strip colored sheet (black sheet).

As will be detailed later, the image forming apparatus U having the automatic original feeding device U1 and the copying machine main body U2 has an after-shipment first power-on discrimination flag (as will be described later) indicating a shipment state, in which "1" is stored at the time of shipment. Accordingly, when the user who purchased the image forming apparatus U turns on the power of the image forming apparatus U at the first time, the power-on time discrimination flag (as will be described later) stores "1". In this case, an indication for instructing the user to attach a colored sheet on the colored sheet attaching part BP1 and operate the image forming apparatus U in a misregistration measurement mode appears on a display unit (see FIG. 1) UI1 of a UI (user interface) for the image forming apparatus U.

If the user performs the operation in accordance with the instruction to perform the misregistration measurement mode, the misregistration from the reference position in the scan direction and the sub scan direction, the magnification of the detected size of the position reading original of regular size with respect to the reference size, and the magnitude of skew are measured at the original reading position PG1 of the original Gi, and the measured values are displayed on the display unit UI1, whereby the set values of operation parameters for the image forming members at the image recording operation of the image forming apparatus main body U2 are automatically corrected based on the measured values.

If the misregistration measurement mode is ended, an indication for instructing the user to peel the colored sheet from the colored sheet attaching part BP1 appears on the display unit UI1 of the UI. The color of the colored sheet attaching part BP1 is white color in a state where the colored sheet is not attached, but the background of the original reading position PG1 is white, when the normal original Gi is read, because the colored sheet is peeled.

In FIG. 3, the copying machine main body U2 comprises U1 (user interface), the IIT (image input terminal) as image reading part disposed in order under the platen glass PG and the IOT (image output terminal, namely, image recording apparatus) as image recording operation part, and the IPS (image processing system) provided in the IIT.

The IIT as original reading device disposed under the transparent platen glass PG on the upper face of the copying machine main body U2 has an exposure system registration sensor (platen registration sensor) Sp disposed at the platen registration position and an exposure optical system A.

The exposure optical system A, of which the movement and stop are controlled based on a detection signal of the exposure system registration sensor Sp, is always stopped at a home position detected by the exposure system registration sensor.

In an ADF mode in which the automatic original feeding device (automatic document feeder) U1 is used for copying, in a state where the exposure optical system A is stopped at the home position to expose each original Gi sequentially passing through the copying position (original reading position) PG1 set on the platen glass PG.

In a platen mode in which the operator manually places the original on the platen glass PG for copying, the exposure optical system A exposes and scans the original on the platen glass PG while moving.

The reflected light from the exposed original Gi passes through the exposure optical system A and is converged on a linear CCD (CCD composed of plural light receiving elements arranged linearly). The CCD converts the reflected light of the original converged on its image pickup plane into electrical signal.

When the IPS creates and stores a read image by converting a read image signal inputted from the CCD into the digital image data and outputs the read image (digital image data) to a laser drive circuit DL of the IOT, the digital data of one page for the stored read image is once developed over the page memory as a laser on/off signal, and stored therein, and the laser on/off signal is read from the page memory and outputted to the laser drive circuit DL.

The laser drive circuit DL outputs a laser drive signal according to the input laser on/off signal (image data) to an ROS (latent image write scan device). The IPS, the laser drive circuit DL and the power circuit E are controlled in operation by a controller C composed of a computer.

The image bearing body PR composed of a photosensitive drum disposed under the ROS is rotated in a direction of the arrow Yp. The surface of the image bearing body PR is charged at − (minus) 700V, for example, by a charging roll (charge roll) in a charging area Q0, and exposed and scanned by a laser beam L of the ROS (latent image write device) at a latent image write position Q1 to form an electrostatic latent image at −300v, for example. The latent image formation on the image bearing body PR by the laser beam L is started in a predetermined time after a sheet sensor (not shown) senses the leading edge of the sheet. The surface of the image bearing body PR on which the electrostatic latent image is formed is rotated and moved to sequentially pass through a development area Q2 and a transfer area (image recording position) Q4.

A developing unit D for developing the electrostatic latent image in the development area Q2 carries a developer containing the toner of − (minus) charging polarity and the carrier of plus charging polarity to the development area Q2 on a development roll R0, and develops the electrostatic latent image on the image bearing body PR passing through the development area Q2 to a toner image Tn.

The transfer roll TR opposed to the image bearing body PR in the transfer area (image recording position) Q4 is a member for transferring the toner image on the surface of the image bearing body PR to the sheet S, and supplied with a transfer voltage of inverse polarity to the charging polarity of the developing toner used by the developing unit D from a power source circuit E. A charging bias applied to the charging roll CR, a development bias applied to the development roll R0, and a transfer bias applied to the transfer roll TR, and the power source circuit E having a heater power source for heating the heater of a heating roll in a fixing device F are controlled by the controller C.

A first paper feed tray TR1 and a second paper feed tray TR2 are disposed vertically on the lower portion of the image forming apparatus main body U1.

A take-out roll (pickup roll) Rp is disposed at an upper right end of each of the first paper feed tray TR1 and the second paper feed tray TR2. A sheet taken out by the pickup roll Rp is extended vertically in a right side portion of the paper feed tray TR1, TR2, and fed to a paper feed passage SH1 extending horizontally on the upper portion of the paper feed tray TR1.

A paper feed member Rs is disposed in a vertically extending portion (right portion of the paper feed tray TR1, TR2) of the paper feed passage SH1, and has a paper feed roll Rs1 and a separation roll (separation member) Rs2 which form a nip part between them by contacting each other. The sheets fed to the nip part are separated one by one by the paper feed member Rs, and fed to the paper feed passage SH1. At an upper end part of the vertically extending portion of the paper feed passage SH1, a feeding roll (forward and backward rotatable feeding roll) Rb that can be rotated forward and backward is disposed. The sheet S fed to the paper feed passage SH1 is fed upward by positive rotations (rotations for feeding the sheet upward) of the forward and backward rotatable feeding roll Rb, and fed through a horizontally extending portion of the paper feed passage SH1 (an upper portion of the paper feed tray TR1) to an upstream sheet feeding passage SH2 by a Mylar gate GT1 disposed in a branch to a sheet reversing connection passage SH5.

The sheet S fed to the upstream sheet feeding passage SH2 is fed to the feeding roll Rs by a registration roller Rr. The sheet S fed to the registration roller Rr is fed from a prior transfer sheet guide SG1 to a transfer area Q4 at the timing when the toner image on the image bearing body PR is moved to the transfer area (image recording position) Q4.

The toner image Tn developed on the surface of the image bearing body PR is transferred onto the sheet S in the transfer area Q4 by the transfer roll TR. After transfer, the surface of the image bearing body PR is cleaned by a photosensitive body cleaner CL1 to remove the residual toner, electrostatically discharged by a photosensitive body static discharger JL, and recharged by the charging roll CR.

An image recording member G (PR+CR+ROS+D+TR+CL1+JL) consists of the image bearing body PR, the charging roll CR, the ROS (latent image write device), the developing unit D, the transfer roll TR, the photosensitive body cleaner CL1, and the photosensitive body static discharger JL.

A downstream sheet feeding passage SH3 for feeding the recorded sheet S where the toner image is recorded in the transfer area Q4 is provided on the downstream side of the transfer area (image recording position) Q4 in the sheet feeding direction. A sheet guide SG2, a sheet feeding belt BH and a fixing device F are disposed on the downstream sheet feeding passage SH3. The fixing device has a heating roll Fh and a pressing roll Fp which are rotated while being contacted with each other, whereby a fixing area Q5 is formed from the pressure contact area (fixing nip). A thermal heater is contained inside the heating roll Fh of the fixing device F, and the fixing device F heats and fixes the toner image on the recording sheet S passing through the fixing area Q5.

The sheet S, on which the toner image is transferred in the transfer area (image recording position) Q4 by the transfer roll TR, is peeled from the surface of the image bearing body PR, and fed through a sheet guide SG2 in the downstream sheet feeding passage SH and a sheet feeding belt BH to the fixing area Q5. When the sheet S on which the toner image is transferred passes through the fixing area Q5, the toner image is heated and fixed by the fixing device F. Then, the sheet S is fed through the sheet output passage SH4 to the paper output tray TRh.

On the sheet output passage SH4, a switching gate (sheet feeding direction control member) GT2 is disposed on the downstream side of the fixing device F. The switching gate GT2 switches the feeding direction of the sheet S passing through the fixing device F into the direction to the paper output tray Rh or the sheet reversing connection passage SH5. The sheet reversing connection passage SH5 connects the downstream side of the fixing device F in the sheet output passage SH4 and the paper feed passage SH1. When the recording sheet S with the image recorded on the first face, after passing through the fixing device F to fix the toner image on the first face, is fed to the sheet reversing connection passage SH5, the sheet S is fed downward on the paper feed passage SH1 by reverse rotations (rotations for feeding the sheet downward) of the feeding roll Rb by passing under the Mylar gate GT1 disposed in the joint between the sheet reversing connection passage SH5 and the paper feed passage SH1. The sheet S is switched back and fed upward by the positive rotation (rotation for feeding the sheet upward) of the feeding roll Rb after its rear end passes through the Mylar gate GT1. The recording sheet S switched back and fed upward is fed sequentially on the horizontally extending portion (upper portion of the paper feed tray TR1) of the paper feed passage SH1 and the upstream sheet feeding passage SH2 by the Mylar gate GT1, and refed to the registration roll Rr, whereby the image is transferred on the second face when the sheet S passes through the transfer area Q (image recording position) 4.

Figure 4:
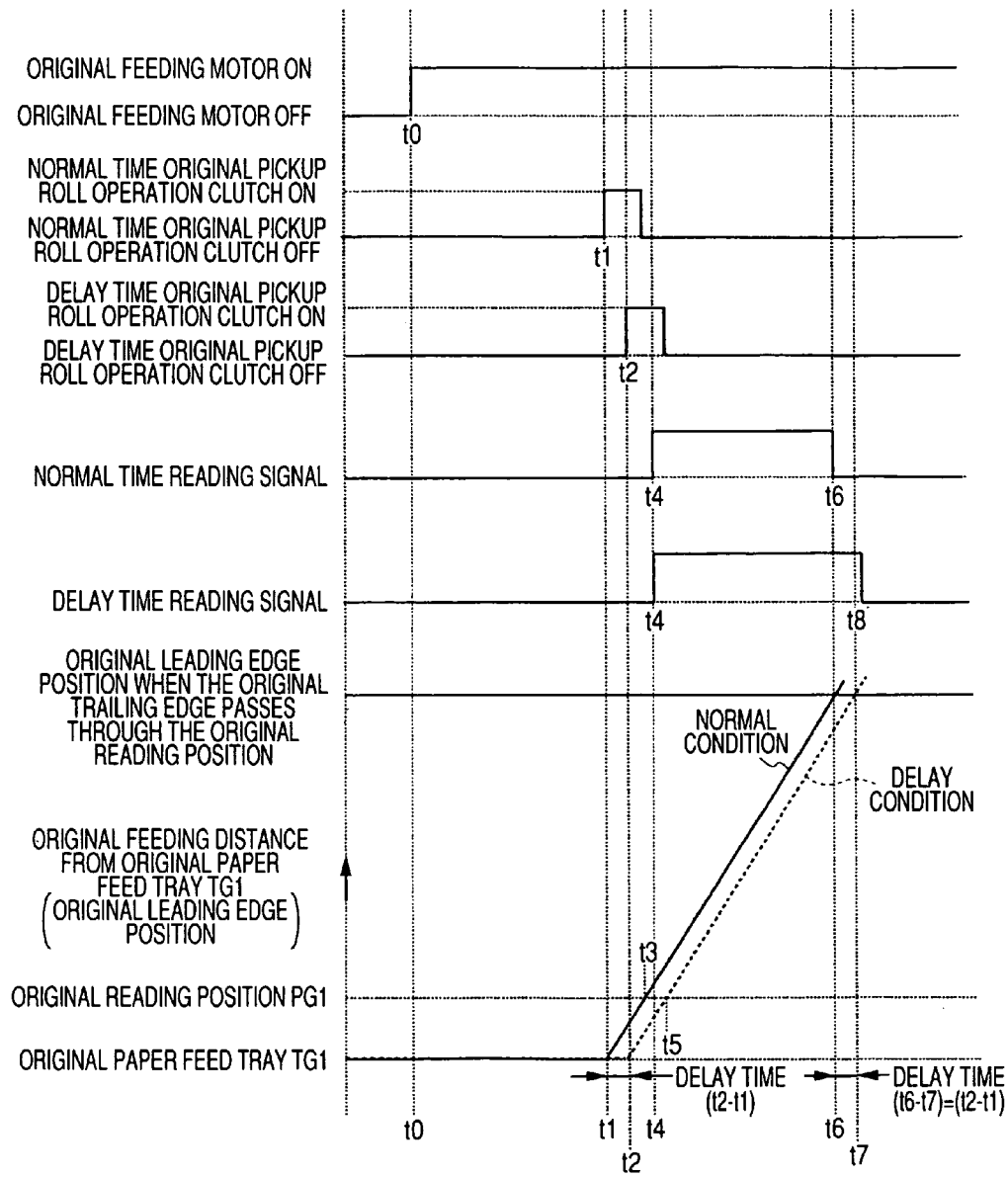
FIG. 4 is a time chart showing the original position of feeding the original at the original feeding start time with respect to the image reading start time set at the normal image formation time and the original position of feeding the original at the original feeding start time in the measurement mode delayed by a set delay time at the normal image formation time.

FIG. 4 is a time chart showing the original position of feeding the original at the original feeding start time with respect to the image reading start time set at the normal image formation time and the original position of feeding the original at the original feeding start time in the measurement mode delayed by a set delay time at the normal image formation time.

In FIG. 4, at time t1 after the elapse of a predetermined time in a state where an original feeding motor is turned on at time t0 (a job of image reading and recording operation is started), an original take-out roll operation clutch at the normal time is turned on, and the original at the normal time is taken out and starts to be fed. The leading edge of the original at the normal time taken out of an original paper feed tray TG1 at time t1 passes through the original reading position PG1 (see FIG. 3) at time t3, and the trailing edge of the original at the normal time passes through the original reading position PG1 at time t6. At time t4 immediately after time t3 where the original at the normal time passes through the original reading position PG1 (see FIG. 3), the reading of the original at the normal time is started. At the same time when the trailing edge of the original at the normal time passes through the original reading position PG1 at time t6, the reading of the original at the normal time is ended. Accordingly, in the case of the original at the normal time, the reading of the original is started from time t4 after time t3 when the leading edge of the original passes, whereby the leading edge position of the original can not be read.

In FIG. 4, the reading start time t4 of the position reading original is identical to the reading start time t4 of the normal original, but the time t2 of taking out the position reading original by the original pickup roll is delayed by the time (t2−t1) from the take-out time t1 of the normal original. With this delay, the time t5 at which the leading edge of the position reading original taken out of the original paper feed tray TG1 at time t2 delayed by a delay time (t2−t1) from the time t1 of the normal original arrives at the original reading position PG1 is behind the reading start time t4. That is, the leading edge of the position reading original arrives at the original reading position PG1 at time t5 after the reading start time t4 of the position reading original passing through the original reading position PG1. Accordingly, the original at the leading edge position can be read in this case.

A reading signal when there is delay is on from time t4 to t8, and the time t8 is behind the time t7 at which the trailing edge of the position reading original when there is delay passes through the original reading position PG1. In this case, the original at the leading edge position can be read.

Figure 5:
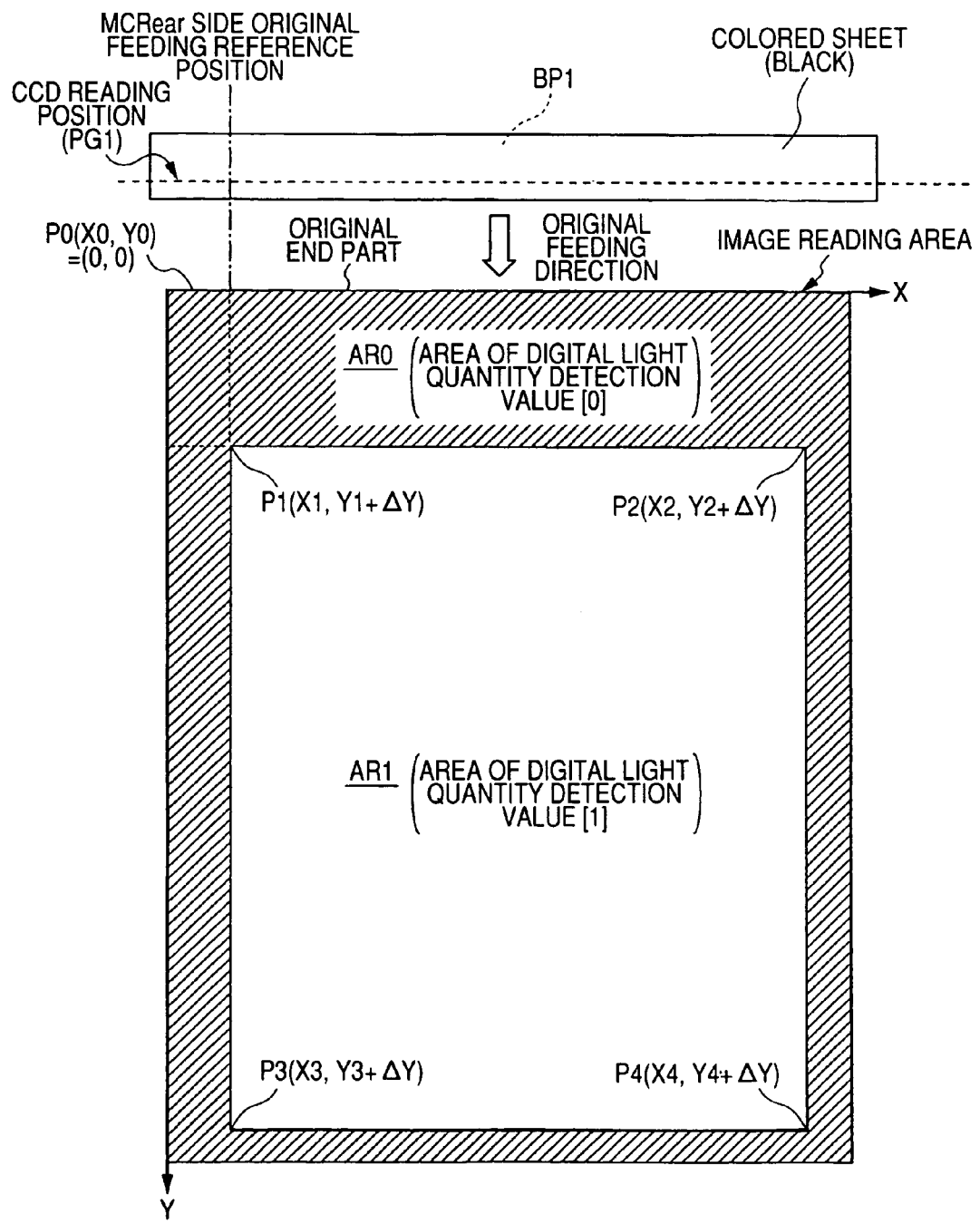
FIG. 5 is an explanatory view for explaining an original read image of the position read original, and showing the image data stored in a page memory.

FIG. 5 is an explanatory view for explaining an original read image of the position read original, and showing the image data stored in a page memory.

In FIG. 5, an image area AR stored in the page memory C2C1 is divided into a background image portion AR0 where "0" is stored and an original image portion AR1 where "1" is stored.

The X axis is the straight line extending in the scan direction along the upstream edge in the sub scan direction in the area AR0 storing "0" that is the background image stored in the page memory C2C1, and the Y axis is the straight line extending in the sub scan direction along the upstream edge in the scan direction, the coordinates (X0, Y0) at an upstream end in the scan direction and the sub scan direction are the X-axis and Y-axis coordinates of origin (X0, Y0)=(0,0), a position P1 is the upstream end in the scan direction and the sub scan direction of the area storing "1" that is the position reading original image stored in the page memory C2C1, a position P2 is the downstream end in the scan direction and the upstream end in the sub scan direction, a point P3 is the upstream end in the scan direction and the downstream end in the sub scan direction, a point P4 is the downstream end in the scan direction and the sub scan direction.

Moreover, the coordinates of each of the points P1 to P4 are P1 (X1,Y1), P2(X2,Y2), P3(X3,Y3) and P4(X4,Y4), and the coordinates X1 to X4 and Y1 to Y4 are the number of light receiving elements from the origin (0,0) to each point P1 to P4 in the scan direction (X axis direction) and the sub scan direction (Y axis direction). In this case, the number of light receiving elements from the page memory C2C1 to the four corner points P1 to P4 coordinates (X1,Y1) to (X4,Y4) of the position reading original image cab be detected and stored. Since the interval between light receiving elements is known, the actual interval (distance) from the origin P0 (0,0) to each point P1 to P4 can be detected, based on the coordinates (X1,Y1) to (X4,Y4) of the points P1 to P4 detected by the number of light receiving elements.

Explanation of Control Part According to First Embodiment

Figure 6:
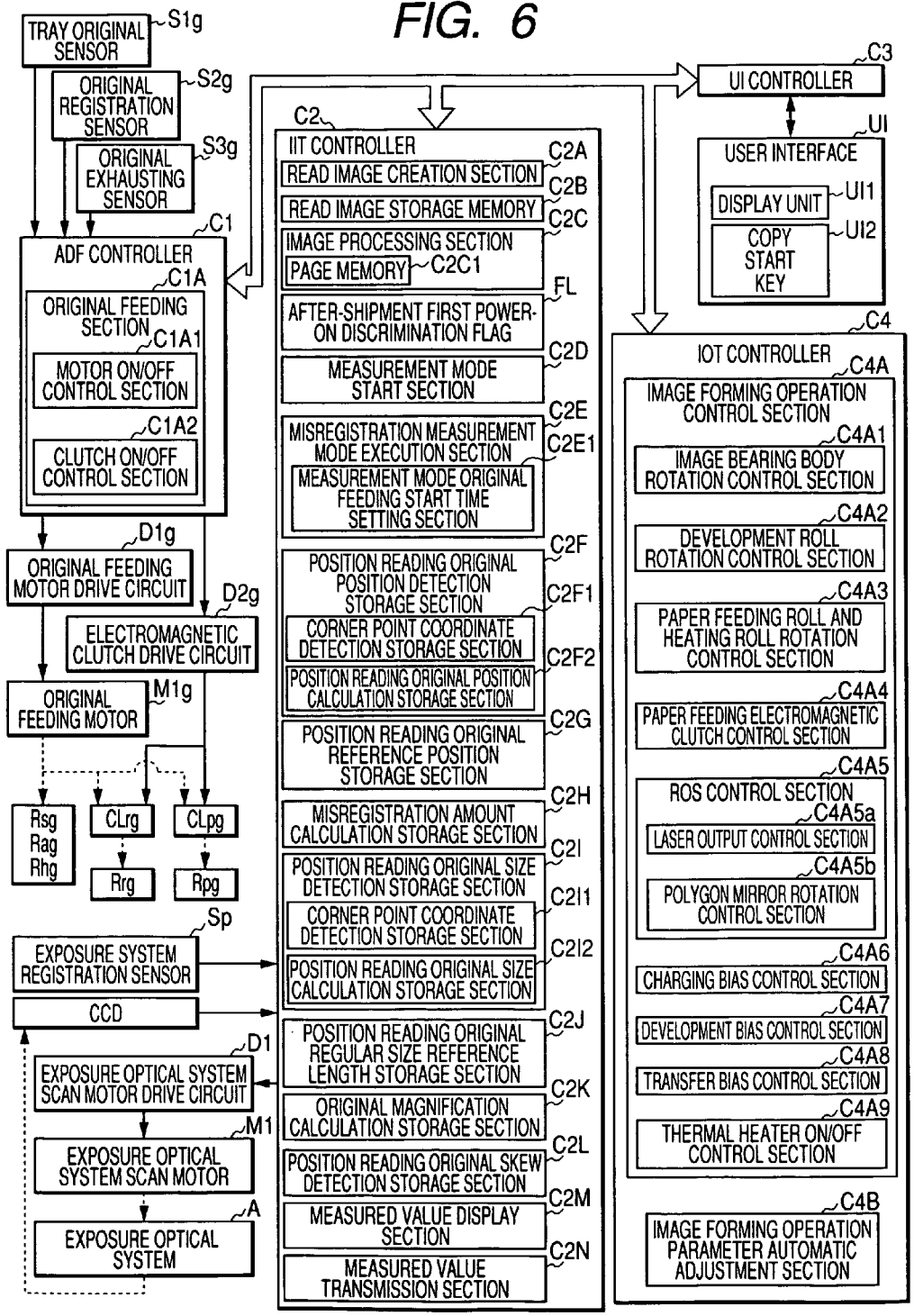
FIG. 6 is an explanatory diagram for a control part of the image forming apparatus according to the invention, and showing a block diagram (functional block diagram) of each function provided for the control part.

FIG. 6 is an explanatory diagram for a control part of the image forming apparatus according to the invention, and showing a block diagram (functional block diagram) of each function provided for the control part.

In FIG. 6, an ADF controller C1 controls the operation of an automatic original feeding device U1, an IIT controller C2 controls the operation of an IIT (image input terminal, namely, image reader (IIT)), a UI controller C3 controls the operation of a UI (user interface), and an IOT controller C4 controls the operation of an IOT (image input terminal, namely, image reader). The ADF controller C1, the IIT controller C2, the UI controller C3 and the IOT controller C4 are interconnected via a bus for signal transmission.

Each of the controllers C1 to C4 as shown in FIG. 6 comprises an I/O (input/output interface) for making the input/output of signal from or to the outside and adjusting the input/output signal level, a ROM (read-only memory) storing program and data for performing the required process, a RAM (random access memory) for temporarily storing the required data, a CPU (central processing unit) for performing the processing according to the program stored in the ROM, and a computer having a clock oscillator, whereby various functions can be implemented by executing the program stored in the ROM.

Signal Input Element Connected to ADF Controller C1

The ADF controller C1 is connected to signal input elements (S1g, S2g, S3g) such as a tray original sensor S1g for detecting the presence or absence of original of the original paper feed tray TG1 in the automatic original feeding device U1, an original registration sensor S2g, and an original output sensor S3g.

Controlled Element Connected to ADF Controller C1

The ADF controller C1 is connected to the controlled elements (D1g, D2g) such as an original feeding motor drive circuit D1g and an electromagnetic clutch drive circuit D2g.

The original feeding motor drive circuit D1g drives an original feeding motor M1g in accordance with a control signal from the ADF controller C1. A torque of the original feeding motor M1g is transmitted to the original feeding members (Rpg, Rsg, Rag, Rrg, Rhg) including the original pickup roller Rpg for picking up the original Gi out of the original paper feed tray GT1 to feed it through a copy position p1 into the original paper output tray TG2, the separation roller Rsg for separating one original from plural originals Gi that are picked up by the pickup roller Rpg, if any, and feeding it to the downstream side, the original feeding roller Rag, and the original registration roller Rrg.

The electromagnetic clutch drive circuit D2g controls the operation of an original pickup roller operating electromagnetic clutch CLpg and an original registration roller operating electromagnetic clutch CLrg in accordance with a control signal from the ADF controller C1.

The original pickup roller operating electromagnetic clutch CLpg turns on the electromagnetic clutch CLpg for transmitting the rotation of the original feeding motor M1g to the pickup roller Rpg, when needed (when picking up the original).

The original registration roller operating electromagnetic clutch CLrg turns on the electromagnetic clutch CLrg for transmitting the rotation of the original feeding motor M1g to the original registration roller Rrg, when needed (at the timing of feeding the original to the original reading position PG1).

ADF Controller C1

The ADF controller C1 has original feeding control section C1A.

The original feeding control section C1A has motor on/off control section C1A1 for controlling the operation of the original feeding motor drive circuit D1g, and clutch on/off control section C1A2 for controlling the operation of the electromagnetic clutch drive circuit D2g, and controls the operation of the controlled elements (D1g, D2g), such as the original feeding motor drive circuit D1g and the electromagnetic clutch drive circuit D2g, in accordance with the input signals from the original sensors S1g to S3g that are the signal input elements, and a transmission signal from the bus connected to the IIT controller C2, the UI controller C3 and the IOT controller C4, to feed the original Gi employing the original feeding members (Rpg, Rsg, Rag, Rrg, Rhg). The original Gi is picked up from the original paper feed tray TG1, passed through the original reading position PG1 and exhausted into the original paper output tray TG2.

Signal Input Elements Connected to IIT Controller C2

The IIT controller C2 is connected to the signal input elements (PS, CCD), such as an exposure system registration sensor (home position sensor) PS for detecting the home position of an exposure optical system A for the IIT, and a CCD disposed on the line and having plural light receiving elements.

The exposure system registration sensor (home position sensor) PS detects the exposure optical system A that is moved to scan and read the original image on the platen glass to be moved to the home position and inputs a detection signal to the IIT controller C2 in a platen mode (mode of reading the original manually placed face-down on the platen glass).

The CCD exposes and scans the original image on the platen glass, and inputs a read original image signal to the IIT controller C2 in the platen mode (mode of reading the original manually placed face down on the platen glass). Also, in the original automatic feeding mode, the CCD reads the original image in passing through the image reading position PG1 and inputs it into the IIT controller C2, while the automatic original feeding device U1 sequentially picks up the original Gi from the original paper feed tray TG1 to feed it through the image reading position PG1 set on the platen glass PG, and exhausts it into the original paper output tray TG2.

Controlled Elements Connected to IIT Controller C2

The IIT controller C2 is connected to the controlled element (D1) such as an exposure optical system scan motor drive circuit D1.

The exposure optical system scan motor drive circuit D1 drives the exposure optical system scan motor M1 in accordance with a control signal from the IIT controller C2, and scans the exposure optical system A in the platen mode (manual mode) of reading the original Gi placed on the platen glass.

The reflected light from the original enters the CCD from the exposure optical system A.

IIT Controller C2

The IIT controller C2 stores data or signal for controlling the operation of the controlled element (D1) in accordance with an output signal of the signal input elements (PS, CCD), or a program for producing the signal to be transmitted to other controllers C1, C3 and C4 connected via the bus B, and has the following function implementing section C2A to C2N by executing the program.

C2A: Read Image Creation Section

The read image creation section C2A creates the read image of digital data by converting the detected light quantity of each light receiving element in the CCD from analog to digital form.

The read image creation section C2A creates the entire image of the read position reading original (position reading original image) with the colored sheet as a background image, where "d0" is the digital value of the quantity of detected light for the light receiving element for detecting the reflected light from the colored sheet becoming a background image and "d1" is the digital value of the quantity of detected light for the light receiving element for detecting the reflected light from the position reading original becoming a position reading original image, when the measurement mode is made, by binarizing the quantity of detected light for each light receiving element in the CCD that reads the position reading original passing through the original reading position against the background of the colored sheet at a predetermined threshold as the boundary.

C2B: Read Image Storage Memory

The read image storage memory C2B stores the read image of digital data created by the read image creation section C2A.

C2C: Image Processing Section

The image processing section C2C has a page memory C2C1. When a read image (digital image data) stored in the read image storage memory C2B is outputted to a laser drive circuit DL of the IOT, the digital data of one page for the stored read image is once developed over the page memory as a laser on/off signal, and stored therein, and the laser on/off signal is read from the page memory and outputted to the laser drive circuit DL.

Also, the image processing section C2C once develops one sheet of position reading original image (digital image data) over the page memory and stores therein, when the image forming apparatus U operates in a misregistration measurement mode. The image data developed over the page memory and stored is used to detect the position coordinates of corner, the misregistration from the reference position, the magnification to the reference size and the skew.

C2C1: Page Memory

The page memory C2C1 stores the digital data of one page for the read image stored in the read image storage memory C2B in a state where it is developed as the laser on/off signal. Also, the page memory stores the image for one sheet of position reading original created by the read image creation section as the image data for detecting the misregistration.

Corner Coordinates

FL: after-shipment first power-on discrimination flag

The after-shipment first power-on discrimination flag FL stores data "1" indicating the shipment condition when shipping the image forming apparatus U having the automatic original feeding device U1 and the copying machine main body U2. Accordingly, when the user who purchased the image forming apparatus U turns on the power of the image forming apparatus U at the first time, "1" is stored in the power-on time discrimination flag (as will be described later). In this case, an indication for instructing to attach a colored sheet on the colored sheet attaching part BP1 and operate the image forming apparatus in the misregistration measurement mode appears on the display unit (see FIG. 1) UI1 of the U1 (user interface) for the image forming apparatus U.

C2D: Measurement Mode Start Section

The measurement mode start section C2D automatically starts the operation of the misregistration measurement mode by the measurement mode execution section C2F, if the after-shipment first power-on discrimination flag FL stores the data indicating the first power-on after shipment when the power of the image forming apparatus U is turned on.

C2E: Misregistration Measurement Mode Execution Section

The misregistration measurement mode execution section C2E has measurement mode time original feeding start time setting section C2E1, and performs a misregistration measurement mode having an operation of measuring a misregistration amount of the position reading original in the scan direction (sheet width direction) with respect to the reference position, a misregistration amount of the position reading original in the sub scan direction (sheet feeding direction) with respect to the reference position, a magnification of the length in the scan direction with respect to the reference value, a magnification of the length in the sub scan direction with respect to the reference value, or a skew amount, based on the read image of the image reader IIT, when feeding the position reading original composed of a position reading sheet of regular size and white ground to the automatic original feeding device U1 in a state where the colored sheet is attached in the colored sheet attaching part BP1 of the back platen member BP in the automatic original feeding device (ADF).

C2E1: Measurement Mode Time Original Feeding Start Time Setting Section

The measurement mode time original feeding start time setting section C2E1 sets the original feeding start time in the measurement mode to be delayed by a set delay time from the original feeding start time for the image reading start time set at the normal image formation time. In this case, the position reading original arrives at an original reading position after starting to read the position reading original. Accordingly, the leading edge of the position reading original is read securely in the measurement mode.

C2F: Position Reading Original Position Detection Storage Section

The position reading original position detection storage section C2F has corner point coordinate detection storage section C2F1 and position reading original position calculation storage section C2F2.

C2F1: Corner Point Coordinate Detection Storage Section

The corner point coordinate detection storage section C2F1 detects and stores the coordinates of four corner points P1 to P4 of the position reading original image from the page memory, where the X axis is the straight line extending in the scan direction along the upstream edge in the sub scan direction in the area AR0 (see FIG. 5) storing "d0" that is the background image stored in the page memory C2C1, and the Y axis is the straight line extending in the sub scan direction along the upstream edge in the scan direction, the coordinates (X0, Y0) at an upstream end in the scan direction and the sub scan direction are the X-axis and Y-axis coordinates (X0, Y0)=(0,0) of origin P0, a position P1 is the upstream end in the scan direction and the sub scan direction of the area storing "d1" that is the position reading original image stored in the page memory C2C1, a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of each of the points P1 to P4 are P1(X1,Y1), P2(X2,Y2), P3(X3,Y3) and P4(X4,Y4), and the coordinates X1 to X4 and Y1 to Y4 are the number of light receiving elements from the origin (0,0) to each point P1 to P4 in the scan direction (X axis direction) and the sub scan direction (Y axis direction).

In the first embodiment, since the Y coordinate of each point P1 to P4 is increased by the number of light receiving elements by which the position reading original is moved during the delay time (see (t2–t1) in FIG. 5), the coordinates of each point P1 to P4 on the page memory C2C1 are {X1, (Y1+ΔY)} to {X4, (Y4+ΔY)}, where ΔY is the increment of Y coordinate. Accordingly, the values of the Y coordinates on the page memory C2C1 subtracted by ΔY are detected as the Y coordinates (Y1 to Y4) of points P1 to P4 at four corners for the position reading original image in the first embodiment.

C2F2: Position Reading Original Position Calculation Storage Section

The position reading original position calculation storage section C2F2 calculates and stores the position Xa of the position reading original in the scan direction along the Y axis, and the position Ya of the position reading original in the Y-axis direction along the X axis from the point coordinates {P1 (X1,Y1), P2(X2,Y2), P3(X3,Y3), P4(X4,Y4)} stored in the corner point coordinate detection storage section.

In the first embodiment, the position reading original position calculation storage section C2F2 calculates and stores Xa and Ya in accordance with the following expressions.

$$Xa = \{(X1+X3)/2\} \quad (1)$$

$$Ya = \{(Y1+Y2)/2\} \quad (2)$$

C2G: Position Reading Original Reference Position Storage Section

The position reading original reference position storage section C2G stores a reference position Xa0 of the position reading original in the scan direction along the Y axis and a reference position Ya0 in the Y-axis direction along the X axis, where the X axis is the straight line extending in the scan direction along the upstream edge in the sub scan direction in the area storing "d0"="0" that is the background image stored in the page memory C2C1, the Y axis is the straight line extending in the sub scan direction along the upstream edge in the scan direction, and the coordinates (X0, Y0) at the upstream end in the scan direction and the sub scan direction are the X-axis and Y-axis coordinates (X0, Y0)=(0,0) of origin.

C2H: misregistration amount calculation storage section

The misregistration amount calculation storage section C2H calculates and stores a misregistration amount (Xa–Xa0) or (Ya–Ya0) of the detected position Xa or Ya of the position reading original from the reference position Xa0 or Ya0, based on the reference position Xa0 or Ya0 of the position reading original stored in the position reading original reference position storage section C2G, and the detection position Xa or Ya of the position reading original detected and stored by the position reading original position detection storage section.

C2I: Position Reading Original Size Detection Storage Section

The position reading original size detection storage section C2I has corner point coordinate detection storage section C2I1 and position reading original size calculation storage section C2I2.

C2I1: Corner Point Coordinate Detection Storage Section

The corner point coordinate detection storage section C2I1 detects and stores the coordinates of four corner points P1 to P4 of the position reading original image from the page memory C2C1, where the X axis is the straight line extending in the scan direction along the upstream edge in the sub scan direction in the area storing "0" that is the background image stored in the page memory C2C1, and the Y axis is the straight line extending in the sub scan direction along the upstream edge in the scan direction, the coordinates (X0, Y0) at an upstream end in the scan direction and the sub scan direction are the X-axis and Y-axis coordinates of origin (X0, Y0)=(0, 0), a position P1 is the upstream end in the scan direction and the sub scan direction of the area storing "1" that is the position reading original image stored in the page memory C2C1, a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of each of the points P1 to P4 are P1(X1,Y1), P2(X2, Y2), P3(X3,Y3) and P4(X4,Y4), and the coordinates X1 to X4 and Y1 to Y4 are the number of light receiving elements from the origin (0,0) to each point P1 to P4 in the scan direction (X axis direction) and the sub scan direction (Y axis direction).

In the first embodiment, since the Y coordinate of each point P1 to P4 is increased by the number of light receiving elements by which the position reading original is moved during the delay time (see (t2–t1) in FIG. 5), the coordinates of each point P1 to P4 on the page memory C2C1 are {X1, (Y1+ΔY)} to {X4, (Y4+ΔY)}, where ΔY is the increment of Y coordinate. Accordingly, the values of the Y coordinates on the page memory C2C1 subtracted by ΔY are detected as the Y coordinates (Y1 to Y4) of points P1 to P4 at four corners for the position reading original image in the first embodiment.

C2I2: Position Reading Original Size Calculation Storage Section

The position reading original size calculation storage section C2I2 calculates and stores the length Lx of the position reading original in the scan direction or the length Ly in the sub scan direction from the point coordinates {P1(X1,Y1), P2(X2,Y2), P3(X3,Y3), P4(X4,Y4)} stored in the corner point coordinate detection storage section C2I1.

The position reading original size calculation storage section C2I2 of the first embodiment calculates and stores the Lx and Ly in accordance with the following expressions (3) and (4), $$Lx=\{(X2+X4)-(X1+X3)\}/2 \qquad (3)$$

$$Ly=\{(Y3+Y4)-(Y1+Y2)\}/2 \qquad (4)$$

C2J: Position Reading Original Regular Size Reference Length Storage Section

The position reading original regular size reference length storage section C2J stores a reference length Lx0 of the position reading original composed of the sheet of regular size in the scan direction or a reference length Ly0 in the sub scan direction.

C2K: original magnification calculation storage section

The original magnification calculation storage section C2K calculates and stores a scan direction magnification (Lx/Lx0) or a sub scan direction magnification (Ly/Ly0) that is the detected length Lx or Ly of the position reading original with respect to the reference length Lx0 or Ly0, based on the reference length Lx0 or Ly0 of the position reading original stored in the position reading original regular size reference length storage section C2J, and the detected length Lx or Ly of the position reading original detected and stored by the position reading original size detection storage section C2I.

C2J: Position Reading Original Skew Detection Storage Section

The position reading original skew detection storage section C2L detects and stores, as a skew amount, an inclination angle θ of an upper edge of the position reading original in the sub scan direction with respect to the X axis (scan direction), or an inclination angle θ of the upstream edge of the position reading original in the scan direction with respect to the Y axis, based on the area storing "d0" that is background image stored in the page memory C2C1 and the area storing "d1" that is position reading original image, where the X axis is the straight line extending in the scan direction along the upstream edge in the sub scan direction in the area storing "d0" that is the background image stored in the page memory, and the Y axis is the straight line extending in the sub scan direction along the upstream edge in the scan direction.

C2M: Measured Value Display Section

The measured value display section C2M displays on a display part U1 of user interface UI a misregistration amount of the position reading original in the scan direction (sheet width direction) with respect to the reference position, a misregistration amount of the position reading original in the sub scan direction (sheet feeding direction) with respect to the reference position, a magnification of the length in the scan direction with respect to the reference value, a magnification of the length in the sub scan direction with respect to the reference value, or a skew amount, which is measured in a measurement mode performed by the misregistration measurement mode execution section C2E.

C2N: Measured Value Transmission Section

The measured value transmission section C2N transmits to the IOT controller C4 the misregistration amount of the position reading original in the scan direction (sheet width direction) with respect to the reference position, the misregistration amount of the position reading original in the sub scan direction (sheet feeding direction) with respect to the reference position, the magnification of the length in the scan direction with respect to the reference value, the magnification of the length in the sub scan direction with respect to the reference value, or the skew amount, which is measured in the misregistration measurement mode performed by the misregistration measurement mode execution section C2E.

The IOT controller C4 receiving the measured value such as misregistration amount corrects the set values of image forming operation parameters (rotation speed of image bearing body PR, laser strength, polygon mirror rotation speed, development bias and so on) of the IOT.

Signal Input Elements Connected to UI Controller C3

The UI controller C3 is connected to various signal input elements (UI1, UI2) of touch panel method provided in the UI (user interface) such as display unit UI1, copy start key UI2 and ten key (not shown).

Controlled Elements Connected to UI Controller C3

The UI controller C3 is connected to the controlled element (UI1) in which the display information is controlled such as the display unit UI1 of the UI (user interface).

UI Controller C3

The UI controller C3 has a function of controlling the display information of the display unit UI that is also the controlled element in accordance with the input signals from the signal input elements (UI1, UI2) or the input signals from other controllers C1, C2 and C4 connected via the bus B, and a function of transmitting the signal to the other controllers C1, C2 and C4.

Signal Input Elements Connected to IOT Controller C4

The IOT controller C4 is connected to various signal input elements of sensors (sheet sensor, temperature sensor, rotation speed sensor and so on) disposed inside the IOT.

(Controlled Element Connected to IOT Controller C4)

The IOT controller C4 is connected to various controlled elements such as a sheet feeding motor, a photosensitive body driving motor, a development bias power supply circuit, and a laser drive circuit.

IOT Controller C4

The IOT controller C4 stores a program for producing the data or signal for controlling the controlled elements or the signal transmitted to other controllers C1, C3 and C4 connected via the bus B in accordance with the input signals from various signal input elements or input signals from other controllers C1, C2 and C3 connected via the bus B, and performs the following function implementing section C4A and C4B by executing the program.

C4A: Image Forming Operation Control Section

The image forming operation control section C4A has the following control section C4A1 to C4A9 for implementing various functions, and performs the image forming operation by controlling the operation of various controlled elements with each control section.

C4A1: Image Bearing Body Rotation Control Section

The image bearing body rotation control section C4A1 controls the operation of the image bearing body drive circuit, and controls the rotation of the image bearing body PR (see FIG. 3) via the image bearing body drive motor.

C4A2: Development Roll Rotation Control Section

The development roll rotation control section C4A2 controls the operation of the development roll drive circuit and controls the rotation of the development roll (see FIG. 3) via the development roll drive motor.

C4A3: Paper Feeding Roll and Heating Roll Rotation Control Section

The paper feeding roll and heating roll rotation control section C4A3 controls the operation of the paper feeding roll and heating roll drive circuit and controls the rotation of the paper feeding rolls (pickup roll Rp (see FIG. 3), selvedge roll Rs, registration roll Rr, paper feeding roll Ra and so on) and the heating roll Fh of the fixing device F via the paper feeding roll and heating roll drive motor.

C4A4: Paper Feeding Electromagnetic Clutch Control Section

The paper feeding electromagnetic clutch control section C4A4 controls the operation of the electromagnetic clutch drive circuit for turning on or off the transmission of torque to the pickup roll Rp (see FIG. 3) and the registration roll Rr, and turns on or off the transmission of torque to the pickup roll Rp and the registration roll Rr via the on/off of the electromagnetic clutch.

C4A5: ROS Control Section

The ROS control section C4A5 has laser output control section C4A5a and polygon mirror rotation control section C4A5b.

C4A5a: Laser Output Control Section

The laser output control section C4A5a controls the operation of a laser drive circuit DL (see FIG. 3), and controls the intensity or emission timing of laser beam for forming the electrostatic latent image that is emitted from a laser diode of the ROS.

C4A5b: Polygon Mirror Rotation Control Section

The polygon mirror rotation control section C4A5b controls the operation of a polygon mirror rotation motor drive circuit, and controls the rotation speed of the polygon mirror of the ROS (see FIG. 3) at the rotation start time.

C4A6: Charging Bias Control Section

The charging bias control section C4A6 controls the operation of a charging bias power supply circuit and controls the charging bias applied to the charging roll CR (see FIG. 3).

C4A7: Development Bias Control Section

The development bias control section C4A7 controls the operation of a development bias power supply circuit and controls the development bias applied to the developing roll CR (see FIG. 3).

C4A8: Transfer Bias Control Section

The transfer bias control section C4A8 controls the operation of a transfer bias power supply circuit and controls the transfer bias applied to the transfer roll TR (see FIG. 3).

C4A9: Thermal Heater On/Off Control Section

The thermal heater on/off control section C4A9 controls the operation of a heater drive circuit and controls the temperature of a fixing area Q5 by turning on or off the thermal heater inside the heating roller Fh in the fixing device F (see FIG. 3).

C4B: Image Forming Operation Parameter Automatic Adjustment Section

The image forming operation parameter automatic adjustment section C4B automatically adjusts the image forming operation parameters (image bearing body rotation speed, polygon mirror rotation speed, laser intensity, charging bias, development bias and so on) of the IOT, when receiving the misregistration amount measured value from the IIT controller C2.

Explanation of Flowchart of the First Embodiment

Figure 7:
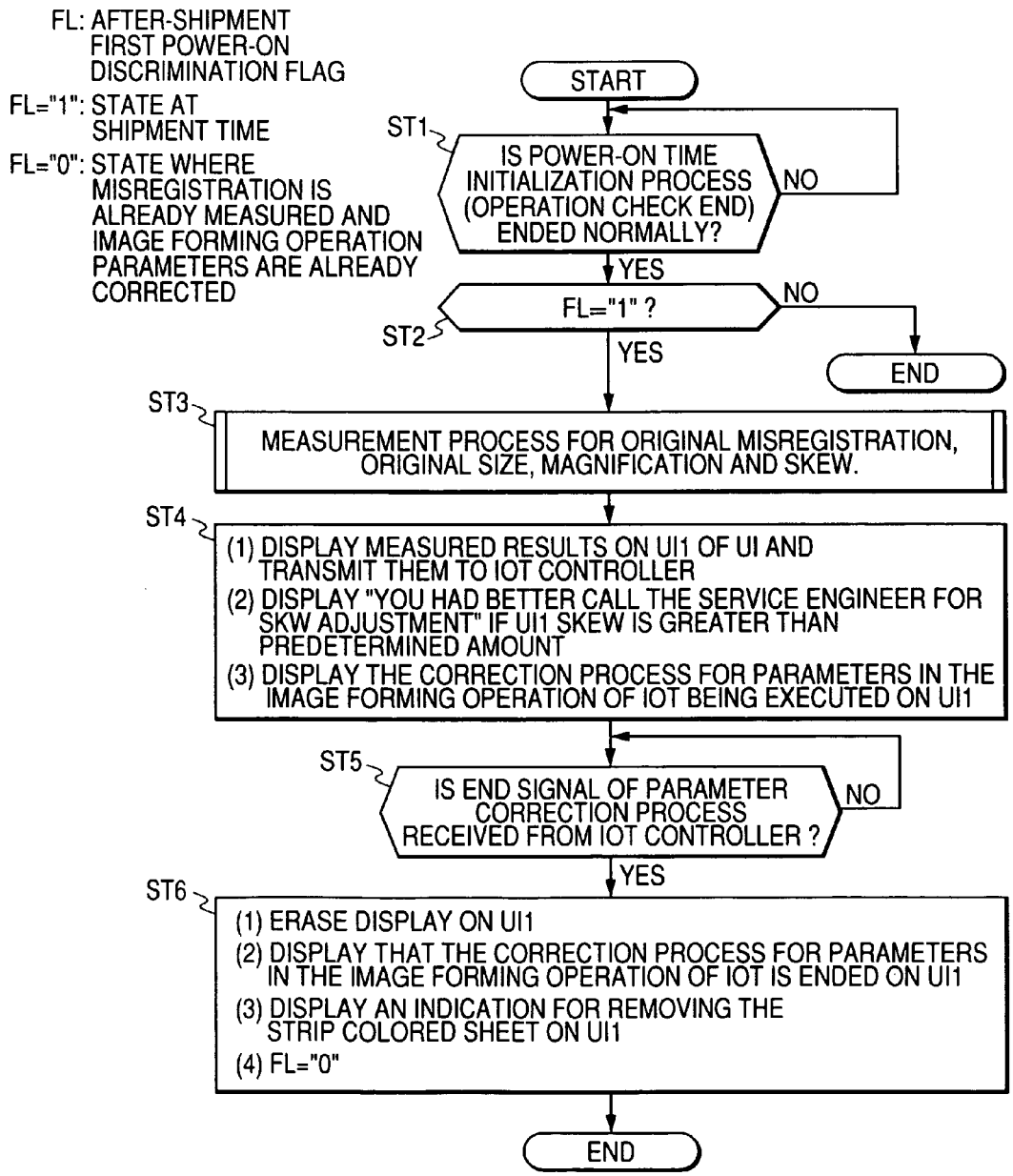
FIG. 7 is a main flowchart of a process for measuring the misregistration for an IIT controller C2 according to the first embodiment.

FIG. 7 is a main flowchart of a process for measuring the misregistration for the IIT controller C2 according to the first embodiment.

The processing at each step in the flowchart of FIG. 7 is performed in accordance with a program stored in the ROM of the controller C2. Also, this process is performed in multi-task in parallel with various other processes of the image forming apparatus. The flowchart of FIG. 7 starts when the power is turned on.

At ST (step) 1 of FIG. 7, a determination is made whether or not the power-on time initialization process (operation check process of the image forming apparatus) is normally ended. If the determination is no (NO), the processing at ST1 is repeated. If the determination is yes (Y), the procedure returns to ST2.

At ST2, a determination is made whether or not the after-shipment first power-on discrimination flag FL is equal to "1". If the determination is no (NO), the main flowchart of the misregistration measurement process of FIG. 7 is ended. If the determination is yes (Y), the procedure returns to ST3. At ST3, the measurement process for the original misregistration, original size magnification and skew is performed. If the measurement process is ended, the procedure goes to ST4.

At ST4, the following process is performed.

(1) The measured results are displayed on the display unit UI1 of the UI (user interface), and transmitted to the IOT controller C4. The IOT controller C4 receiving the measured results performs a correction process for the image forming operation parameters in accordance with the measured results.

(2) If the measured skew is greater than a predetermined value, a message "you had better call the service engineer for skew adjustment." is displayed on the display unit UI1 of the UI (user interface).

(3) A message that the IOT is performing the correction process for the image forming operation parameters is displayed on the display unit UI1 of the UI (user interface).

At ST5, a determination is made whether or not an end signal of the parameter correction process is received from the IOT controller C4. If the determination is no (NO), step ST5 is repeated. If the determination is yes (Y) (i.e., the correction process end signal is received from the IOT controller C4), the procedure goes to step ST6. At ST6, the following process is performed.

(1) Erase the indication displayed up to now on the display unit UI1 of the UI (user interface).

(2) an indication that the correction process for parameters in the image forming operation of the IOT is ended is displayed on the display unit UI1 of the UI (user interface).

(3) an indication for instructing the user to remove the strip colored sheet from the strip colored sheet attaching part BP1 of the BP (back platen member) is displayed on the display unit UI1 of the UI (user interface).

(4) Set the power-on time discrimination flag FL to "0".

Then, the main flowchart of the measurement process for the misregistration as shown in FIG. 7 is ended.

FIG. 8 is a flowchart of a process for measuring the misregistration (sub-routine of ST3 in FIG. 7).

If the process of FIG. 8 is started, a message "Attach the strip colored sheet to the back platen part of the automatic original feeding device and set the position reading original. After setup, depress the copy start key." is displayed on the display unit UI1 of the user interface UI at ST11.

At ST12, a determination is made whether or not the copy start key is turned on. If the determination is no (NO), ST12 is repeated. If the determination is yes (Y), the procedure goes to ST13.

At ST13, the paper feed of the position reading original of regular sized is started at time t2 delayed by a set delay time (t2−t1) from the original feed time t1 (see FIG. 4) set for the normal original reading start time t4 (see FIG. 4).

At ST14, a determination is made whether or not it is the original reading start time t2 (see FIG. 4). If the determination is no (NO), step ST14 is repeated. If the determination is yes (Y), the procedure goes to step ST15.

At ST15, the position reading original is read and A/D converted, the read original image against the background of the colored sheet is stored in the read image storage memory C2B, and the read image stored in the read image storage memory C2B is developed over the page memory C2C1 and stored therein (see FIG. 5).

At ST16, the coordinates of four corner points P1 to P4 of the read original image (see FIG. 5) stored in the page memory C2C1 are detected and stored. That is, P1(X1,Y1), P2(X2,Y2), P3(X3,Y3) and P4(X4,Y4) are stored. In the first embodiment as shown in FIG. 5, the Y coordinate of each point P1 to P4, plus a distance ΔY by which the position reading original is fed in the sub scan direction for the delay time (t2−t1), is detected. Accordingly, the values of the Y coordinates (Y1 to Y4) of each point P1 to P4 subtracted by the distance ΔY are stored as the detected values of the Y coordinates of each corner point P1 to P4.

The following process is performed at ST17.

(1) The position Xa of the position reading original image in the scan direction and the position Ya in the sub scan direction are detected and stored. The detected values Xa and Ya are obtained from the coordinates P1(X1,Y1), P2(X2,Y2), P3(X3,Y3) and P4(X4,Y4) of four corner points P1 to P4 in accordance with the following expressions.

$$Xa=\{(X1+X3)/2\} \quad (1)$$

$$Ya=\{(Y1+Y2)/2\} \quad (2)$$

(2) The misregistration amounts (Xa−Xa0) and (Ya−Ya0) of the detected position (Xa,Ya) from the stored reference position (Xa0,Ya0) are calculated and stored.

The following process is performed at ST18.

(1) The size Lx in the scan direction and the size Ly in the sub scan direction of the position reading original image of regular size are detected and stored. The detected values Lx and Ly are obtained from the coordinates P1(X1,Y1), P2(X2,Y2), P3(X3,Y3) and P4(X4,Y4) of four corner points P1 to P4 in accordance with the following expressions.

$$Lx=\{(X2+X4)-(X1+X3)\}/2 \quad (3)$$

$$Ly=\{(Y3+Y4)-(Y1+Y2)\}/2 \quad (4)$$

(2) The scan direction magnification (Lx/Lx0) and the sub scan direction magnification (Ly/Ly0) are calculated from the length detection values (Lx,Ly) and the stored reference length (Lx0,Ly0).

At ST19, the inclination angle θ of the line connecting the points P1 and P2 with respect to the X axis (line extending in the scan direction) is calculated and stored as the skew amount.

Assuming that the inclination angle of the line connecting the points P1 and P2 with respect to the X axis (line extending in the scan direction) is θ, the following expression holds.

$$\tan \theta = (Y2-Y1)/(X2-X1) \quad (5)$$

θ can be obtained from this expression (5).

Then, the flowchart of the measurement process for the misregistration (subroutine of ST3) as shown in FIG. 8 is ended, and the procedure goes to ST4 of FIG. 7.

(Operation of First Embodiment)

In the first embodiment, when the image forming apparatus U shipped from the factory is delivered to the user and the power is firstly turned on, the original misregistration amount, original size magnification and skew are automatically measured. At this time, the position reading original is read in a state where the colored sheet is attached on the colored sheet attaching part BP1 of the back platen member BP, whereby the original image can be read employing the normal while position reading original. Accordingly, when the background color of the back platen portion is white, there is no trouble that the colored position reading original must be prepared.

Since the original image read against the background of the colored sheet has a clear contrast with the background, the original misregistration amount, the original size magnification, and the skew can be easily measured. After the end of this measurement, the normal original can be read by peeling the colored sheet attached on the colored sheet attaching part BP1 of the back platen member BP. In this case, if the colored sheet attaching part BP1 has white color when the colored sheet is peeled, there is no coloring from the background part (back platen portion) of the original, even when the original image of thin sheet is read.

Modified Embodiments

Though the embodiment of the present invention has been described above, the invention is not limited to the above embodiment, but various changes may be made thereto without departing from the scope or spirit of the invention as defined in the claims. The variant embodiments (H01) to (H03) of the invention are exemplified below.

(H01) The position reading original position detection storage section C2F of the first embodiment may detect the position Xa of the position reading original in the scan direction along the Y axis, and the position Ya of the position reading original in the Y-axis direction along the X axis, based on an area storing "d0" that is background image stored in the page memory and an area storing "d1" that is position reading original image, where the X axis is the straight line extending in the scan direction along the upstream edge in the sub scan direction in the area storing "d0" that is the background image stored in the page memory C2C1, and the Y axis is the straight line extending in the sub scan direction along the upstream edge in the scan direction.

(H02) In the first embodiment, "d0"="0" and "d1"="0", or "d0"="1" and "d1"="0" may be set to perform the image processing.

(H03) In the first embodiment, the original feeding start time in the measurement mode is delayed by a set delay time from the original feeding start time for the image reading start time set at the normal image formation time, but the original reading start time may be set earlier.

According to an aspect of the present invention, misregistration of original, size magnification of original with respect to the reference size and skew can be easily measured, employing a normal original with the white periphery, but not the special original.

The components of the invention are affixed with the reference numerals or signs of the components of the embodiments parenthesized to facilitate the correspondence with the components of the embodiments.

The reason why the invention is described in correspondence to the reference numerals or signs of the embodiments is to facilitate the understanding of the invention, but not to limit the scope of the invention.

According to a further aspect of the invention, there is provided an automatic original feeding device comprising (A01) and (A02):

(A01) the automatic original feeding device (U1) having an original paper feed tray (TG1) for laying an original to read the image, the original paper feed tray being supported on an upper face of a platen glass (PG) for an image reader (IIT) that reads an image of the original passing through an original reading position (PG1) set along a straight line on the upper face of the platen glass (PG) disposed at an upper end, an original paper output tray (TG2), and original feeding members (Rpg, Rsg, Rag, Rrg, Rhg) for sequentially feeding the original laid on the original paper feed tray (TG1) to the original reading position (PG1) and the original paper output tray (TG2); and (A02) the automatic original feeding device (U1) having a strip sheet attaching part (BP1) for detachably attaching a strip colored sheet, the strip sheet attaching part provided in a back platen member (BP) disposed in a portion opposed to the original reading position (PG1) in a state where it is supported on the upper face of the platen glass (PG).

According to the automatic original feeding device (U1) of the invention, there is provided the automatic original feeding device (U1) comprising the composition requirements (A01) and (A02) has an original paper feed tray (TG1) for laying an original to read the image, an original paper output tray (TG2), and original feeding members (Rpg, Rsg, Rag, Rrg, Rhg), in which the original paper feed tray is supported on an upper face of a platen glass (PG) disposed at an upper end of an image reader (IIT). The automatic original feeding device (U1) sequentially feeds the original laid on the original paper feed tray (TG1) to the original reading position (PG1) set along a straight line on the upper face of the platen glass (PG) and the original paper output tray (TG2) The image reader (IIT) reads an image of the original passing through the original reading position (PG1).

The automatic original feeding device (U1) has a strip sheet attaching part (BP1) provided in a back platen member (BP) disposed in a portion opposed to the original reading position (PG1) in a state where it is supported on the upper face of the platen glass (PG), the strip sheet attaching part (BP1) detachably attaches a strip colored sheet.

The normal original of regular size with the white periphery is fed to pass through the original reading position (PG1), where the image reader (IIT) reads the original, in a state where the strip colored sheet having clear contrast with the white color is attached in the strip sheet attaching part of the automatic original feeding device (U1), whereby the image of original (original image) with the color of the colored sheet as the background image can be read. The measured value of the position in the scan direction and sub scan direction, the size, or the skew of the read original can be obtained from the original image with the color of the colored sheet as the background image which is read by the image reader (IIT).

If the reference value of the position in the scan direction and sub scan direction at the original reading position (PG1) of the original of regular size read at the original reading position (PG1) is stored, the misregistration amount of the measured value of the position in the scan direction and sub scan direction of the read original (measured position in the scan direction and sub scan direction) from the reference position can be measured.

The measured misregistration amount in the scan direction can be automatically corrected in accordance with the following method (1) or (2), when the IOT (image recording apparatus) records (forms) the image.

(1) Method for adjusting the write start timing in the scan direction of laser beam forming an electrostatic latent image on the surface of the charged image bearing body (PR).

(2) Method for adjusting the position in the width direction (position in the scan direction of the recording paper passing through the image transfer position (Q4) by axially moving the registration roll (Rr) when feeding the recording paper to the image transfer position (Q4), in which the registration roll (Rr) for feeding the recording paper to the image transfer position (image recording position) (Q4) onto the recording paper is configured to be axially movable.

The measured misregistration amount in the sub scan direction can be automatically corrected in accordance with the following method (3) or (4), when the IOT (image recording apparatus) records the image.

(3) Method for adjusting the write start timing in the sub scan direction of laser beam forming an electrostatic latent image on the surface of the charged image bearing body (PR).

(4) Method for adjusting the position in the feeding direction (sub scan direction) of the recording paper passing through the image transfer position by adjusting the rotation start timing of the registration roll (Rr) feeding the recording paper to the image transfer position (image recording position) (Q4) onto the recording paper, and adjusting the time at which the recording paper arrives at the image transfer position (Q4).

Also, if the reference value of size (reference size) in the scan direction and sub scan direction of the original of regular size read at the original reading position (PG1) is stored, the size magnification of the measured value of the size (measured size) in the scan direction and sub scan direction of the read original with respect to the reference size can be measured.

The measured size magnification in the scan direction can be automatically corrected in accordance with the following method (5) or (6), when the IOT (image recording apparatus) records the image.

(5) Method for adjusting the pulse interval of pulses which output the laser beam forming an electrostatic latent image on the surface of the charged image bearing body (PR).

(6) Method for adjusting the rotation rate of a polygonal rotating mirror (polygon mirror) for scanning the laser beam (L) to form an electrostatic latent image on the surface of the charged image bearing body (PR).

The measured size magnification in the sub scan direction can be automatically corrected in accordance with the following method (7), when the IOT (image recording apparatus) records the image.

(7) Method for adjusting the rotation rate of the rotating image bearing body (PR).

When the measured skew is large, the skew correction may be made by the service engineer adjusting the inclination of the registration roll axis of the automatic original feeding device U1.

Also, when the measured skew is small, the skew correction may be made in accordance with the following methods (8) to (10) when the image is formed by the IOT (image recording apparatus).

(8) Method for once stopping the recording paper (S) at the registration roll (Rr) ceased rotating to form a loop in the recording paper (S) and then starting the rotation of the registration roll (Rr) to feed the recording paper (S), in which the service engineer is called to adjust the axial direction of the registration roll (Rr).

(9) Method for once stopping the recording paper (S) at the registration roll (Rr) ceased rotating to form a loop in the recording paper (S) and then starting the rotation of the registration roll (Rr) to feed the recording paper (S), in which the axis of the registration roll (Rr) is automatically adjusted by providing a mechanism for automatically adjusting the axial direction of the registration roll (Rr).

(10) Method for once stopping the registration roll (Rr) when the leading edge of the recording paper (S) is sensed by a sheet sensor for sensing the leading edge of the recording sheet (S) fed by the rotating registration roll (Rr), and restarting the rotation of the registration roll (Rr) at a predetermined timing to feed the recording paper (S), in which the inclination of a side guide is automatically adjusted by providing a mechanism for adjusting the inclination of the side guide for guiding one edge in the width direction of the recording paper (S) fed by the registration roll (Rr).

According to a still further aspect of the invention, there is provided an image reader (IIT) of the invention comprising the composition requirements (A03) to (A06):

(A03) the image reader (IIT) having a platen glass (PG) disposed at an upper end, an original illuminating member for illuminating an original passing through an original reading position (PG1) set along a straight line on an upper face of the platen glass (PG), a CCD having a number of light receiving elements arranged along the straight line to detect a quantity of reflected light from the original, read image creation section (C2A) for creating a read image of digital data by converting a quantity of detected light for each light receiving element in the CCD from analog to digital form, and a read image storage memory (C2B) for storing the read image created by the read image creation section (C2A);

(A04) the CCD reads an image of a position reading original (position reading original image), when the position reading original consisting of a position reading sheet of regular size and white ground fed by an automatic original feeding device (U1) passes through the original reading position (PG1) in a state where a strip colored sheet is detachably attached in the colored sheet attaching part (BP1), the automatic original feeding device (U1) having a colored sheet attaching part (BP1) provided in a back platen member (BP) disposed in a portion opposed to the original reading position (PG1) in a state where it is supported on the upper face of the platen glass (PG), an original paper feed tray (TG1), an original paper output tray (TG2), and original feeding members (Rpg, Rsg, Rag, Rrg, Rhg) for sequentially feeding the original laid on the original paper feed tray (TG1) to the original reading position (PG1) and the original paper output tray (TG2);

(A05) the read image creation section (C2A) for creating the entire image of the read position reading original (position reading original image) with the colored sheet as a background image, where "d0" is the digital value of the quantity of detected light for the light receiving element for detecting the reflected light from the colored sheet becoming the background image and "d1" is the digital value of the quantity of detected light for the light receiving element for detecting the reflected light from the position reading original becoming the position reading original image, by binarizing the quantity of detected light for each light receiving element in the CCD that reads the position reading original passing through the original reading position against the background of the colored sheet at a predetermined threshold as the boundary; and (A06) a page memory (C2C1) for storing the image of one sheet of the position reading original as the image data of one page.

According to the image reader (IIT) of the invention there is provided the image reader (IIT) comprising the composition requirements (A03) to (A06), an original illuminating member illuminates an original passing through an original reading position (PG1) set along a straight line on an upper face of the platen glass (PG) disposed at the upper end. The CCD having a number of light receiving elements arranged along a straight line detects a quantity of reflected light from the original. The read image creation section (C2A) creates a read image of digital data by converting a quantity of detected light for each light receiving element in the CCD from analog to digital form. The read image storage memory (C2B) of the image reader (IIT) stores the read image of digital data created by the read image creation section (C2A).

The automatic original feeding device (U1) has a colored sheet attaching part (BP1) provided in a back platen member (BP) disposed in a portion opposed to the original reading position (PG1) in a state where it is supported on the upper face of the platen glass (PG), an original paper feed tray (TG1), an original paper output tray (TG2), and original feeding members (Rpg, Rsg, Rag, Rrg, Rhg) sequentially feeding the original laid on the original paper feed tray (TG1) to the original reading position (PG1) and the original paper output tray (TG2).

The CCD of the image reader (IIT) reads an image of a position reading original (position reading original image), when the position reading original consisting of a position reading sheet of regular size and white ground fed by the automatic original feeding device (U1) passes through the original reading position (PG1) in a state where the automatic original feeding device (U1) detachably attaches a strip colored sheet in the colored sheet attaching part (BP1).

The read image creation section (C2A) of the image reader (IIT) creates the entire image of the read position reading original (position reading original image) with the colored sheet as a background image, where "d0" is the digital value of the quantity of detected light for the light receiving element for detecting the reflected light from the colored sheet becoming the background image and "d1" is the digital value of the quantity of detected light for the light receiving element for detecting the reflected light from the position reading original becoming the position reading original image, by binarizing the quantity of detected light for each light receiving element in the CCD that reads the position reading original passing through the original reading position (PG1) against the background of the colored sheet at a predetermined threshold as the boundary.

The page memory (C2C1) stores the image of one sheet of the position reading original as the image data of one page.

According to the image reader (IIT) of the invention, there is provided the image reader (IIT) further comprising the composition requirement (A07), (A07) the digital values "d0" and "d1" are set such that "d0"="0" and "d1"="1".

In this case, the digital values "d0" and "d1" are set such that "d0"="0" and "d1"="1", whereby "0" is stored in the background image portion of the read image of digital data and "1" is stored in the position reading original image portion.

According to the image reader (IIT) of the invention, there is provided the image reader (IIT) further comprising the composition requirements (A08) to (A010) in the second invention as above described, (A08) position reading original position detection storage section (C2F) for detecting and storing a position Xa of the position reading original in the scan direction along the Y axis, and a position Ya in the Y-axis direction along the X axis, based on an area storing "d0" that is background image stored in the page memory (C2C1) and an area storing "d1" that is position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction;

(A09) position reading original reference position storage section (C2G) for storing a reference position Xa0 of the position reading original in the scan direction along the Y axis and a reference position Ya0 in the Y-axis direction along the X axis; and (A010) misregistration amount calculation storage section (C2H) for calculating and storing a misregistration amount (Xa−Xa0) or (Ya−Ya0) of the detected position Xa or Ya of the position reading original from the reference position Xa0 or Ya0, based on the reference position Xa0 or Ya0 of the position reading original stored in the position reading original reference position storage section (C2G), and the detected position Xa or Ya of the position reading original detected and stored by the position reading original position detection storage section (C2F).

In this case, the position reading original position detection storage section (C2F) detects and stores a position Xa of the position reading original in the scan direction along the Y axis, and a position Ya in the Y-axis direction along the X axis, based on an area storing "d0" that is background image stored in the page memory (C2C1) and an area storing "d1" that is position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction.

The position reading original reference position storage section (C2G) stores a reference position Xa0 of the position reading original in the scan direction along the Y axis and a reference position Ya0 in the Y-axis direction along the X axis.

The misregistration amount calculation storage section (C2H) calculates and stores a misregistration amount (Xa−Xa0) or (Ya−Ya0) of the detected position Xa or Ya of the position reading original from the reference position Xa0 or Ya0, based on the reference position Xa0 or Ya0 of the position reading original stored in the position reading original reference position storage section (C2G), and the detected position Xa or Ya of the position reading original detected and stored by the position reading original position detection storage section (C2F).

(Third Invention)

According to a still further aspect of the invention, there is provided an image forming apparatus comprising the composition requirements (B01) to (B08), (B01) an image reader (IIT) having a platen glass (PG) disposed at an upper end, an original illuminating member for illuminating an original passing through an original reading position (PG1) set along a straight line on an upper face of the platen glass (PG), and a CCD having a number of light receiving elements arranged along the straight line to detect a quantity of reflected light from the original;

(B02) an automatic original feeding device (U1) having a colored sheet attaching part (BP1) for detachably attaching a strip colored sheet, the strip attaching part provided in a back platen that is a portion opposed to the original reading position (PG1) in a state where it is supported on the upper face of the platen glass (PG), an original paper feed tray (TG1) for laying the original to read the image, an original paper output tray (TG2), and original feeding members (Rpg, Rsg, Rag, Rrg, Rhg) for sequentially feeding the original laid on the original paper feed tray (TG1) to the original reading position (PG1) and the original paper output tray (TG2);

(B03) an image recording apparatus (IOT) for recording the image read by the image reader (IIT) on a recording sheet and outputting the sheet;

(B04) misregistration measurement mode execution section (C2E) for performing a misregistration measurement mode having an operation of measuring a misregistration amount of the position reading original in the scan direction (sheet width direction) with respect to the reference position, a misregistration amount in the sub scan direction (sheet feeding direction) with respect to the reference position, a magnification of the length in the scan direction with respect to the reference value, a magnification of the length in the sub scan direction with respect to the reference value, or a skew amount, based on the read image of the image reader (IIT), when the position reading original consisting of a position reading sheet of regular size and white ground is fed by the automatic original feeding device (U1) in a state where the colored sheet is attached;

(B05) measurement mode start section (C2D) for starting the operation of the misregistration measurement mode by the misregistration measurement mode execution section (C2E);

(B06) the CCD that reads an image of the position reading original (position reading original image), when the position reading original consisting of the position reading sheet of regular size and white ground fed by the automatic original feeding device (U1) passes through the original reading position (PG1) in a state where the automatic original feeding device (U1) detachably attaches a strip colored sheet in the colored sheet attaching part (BP1);

(B07) read image creation section (C2A) for creating the entire image of the read position reading original (position reading original image) with the colored sheet as a background image, where "d0" is the digital value of the quantity of detected light for the light receiving element for detecting the reflected light from the colored sheet becoming the background image and "d1" is the digital value of the quantity of detected light for the light receiving element for detecting the reflected light from the position reading original becoming the position reading original image by binarizing the quantity of detected light for each light receiving element in the CCD that reads the position reading original passing through the original reading position (PG1) against the background of the colored sheet at a predetermined threshold as the boundary in performing the measurement mode; and (B08) a page memory (C2C1) for storing the image of one sheet of the position reading original created by the read image creation section (C2A) as the image data of one page.

In this case, the original illuminating member of the image reader (IIT) illuminates an original passing through an original reading position (PG1) set along a straight line on an upper face of the platen glass (PG) disposed at the upper end. The CCD having a number of light receiving elements arranged along the straight line detects a quantity of reflected light from the original.

The automatic original feeding device (U1) has a colored sheet detachably attached in the strip attaching part (BP1) provided in a back platen that is a portion opposed to the original reading position (PG1) in a state where it is supported on the upper face of the platen glass (PG). The automatic original feeding device (U1) sequentially feeds the original laid on the original paper feed tray (TG1) for laying the original to read the image to the original reading position (PG1) and the original paper output tray (TG2).

The image recording apparatus (IOT) records the image read by the image reader (IIT) on a recording sheet (S) and outputting the sheet.

The misregistration measurement mode execution section (C2E) performs a misregistration measurement mode having an operation of measuring a misregistration amount of the position reading original in the scan direction (sheet width direction) with respect to the reference position, a misregistration amount in the sub scan direction (sheet feeding direction) with respect to the reference position, a magnification of the length in the scan direction with respect to the reference value, a magnification of the length in the sub scan direction with respect to the reference value, or a skew amount, based on the read image of the image reader (IIT), when the position reading original consisting of a position reading sheet of regular size and white ground is fed by the automatic original feeding device (U1) in a state where the colored sheet is attached.

The measurement mode start section (C2D) starts the operation of the misregistration measurement mode by the misregistration measurement mode execution section (C2E).

The CCD reads an image of the position reading original (position reading original image), when the position reading original consisting of the position reading sheet of regular size and white ground fed by the automatic original feeding device (U1) passes through the original reading position (PG1) in a state where the automatic original feeding device (U1) detachably attaches a strip colored sheet in the colored sheet attaching part (BP1)

In performing the measurement mode, the read image creation section (C2A) creates the entire image of the read position reading original (position reading original image) with the colored sheet as a background image, where "d0" is the digital value of the quantity of detected light for the light receiving element for detecting the reflected light from the colored sheet becoming the background image and "d1" is the digital value of the quantity of detected light for the light receiving element for detecting the reflected light from the position reading original becoming the position reading original image by binarizing the quantity of detected light for each light receiving element in the CCD that reads the position reading original passing through the original reading position (PG1) against the background of the colored sheet at a predetermined threshold as the boundary.

The page memory (C2C1) stores the image of one sheet of the position reading original created by the read image creation section (C2A) as the image data of one page.

According to the image forming apparatus of the invention, there is provided the image forming apparatus comprising the composition requirement (A07), (A07) the digital values "d0" and "d1" are set such that "d0"="0" and "d1"="1".

In this case, the digital values "d0" and "d1" are set such that "d0"="0" and "d1"="1", whereby "0" is stored in the background image portion of the read image of digital data and "1" is stored in the position reading original image portion.

According to the image forming apparatus of the invention, there is provided the image forming apparatus comprising the composition requirements (A08) to (A010), (A08) position reading original position detection storage section (C2F) for detecting and storing a position Xa of the position reading original in the scan direction along the Y axis, and a position Ya in the Y-axis direction along the X axis, based on an area storing "d0" that is background image stored in the page memory (C2C1) and an area storing "d1" that is position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction;

(A09) position reading original reference position storage section (C2G) for storing a reference position Xa0 of the position reading original in the scan direction along the Y axis and a reference position Ya0 in the Y-axis direction along the X axis; and (A010) misregistration amount calculation storage section (C2H) for calculating and storing a misregistration amount (Xa−Xa0) or (Ya−Ya0) of the detected position Xa or Ya of the position reading original from the reference position Xa0 or Ya0, based on the reference position Xa0 or Ya0 of the position reading original stored in the position reading original reference position storage section (C2G), and the detected position Xa or Ya of the position reading original detected and stored by the position reading original position detection storage section (C2F).

In this case, the position reading original position detection storage section (C2F) detects and stores a position Xa of the position reading original in the scan direction along the Y axis, and a position Ya in the Y-axis direction along the X axis, based on an area storing "d0" that is background image stored in the page memory (C2C1) and an area storing "d1" that is position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction.

The position reading original reference position storage section (C2G) stores a reference position Xa0 of the position reading original in the scan direction along the Y axis and a reference position Ya0 in the Y-axis direction along the X axis.

The misregistration amount calculation storage section (C2H) calculates a misregistration amount (Xa−Xa0) or (Ya−Ya0) of the detected position Xa or Ya of the position reading original from the reference position Xa0 or Ya0, based on the reference position Xa0 or Ya0 of the position reading original stored in the position reading original reference position storage section (C2G), and the detected position Xa or Ya of the position reading original detected and stored by the position reading original position detection storage section (C2F).

(Form 3 of Third Invention)

According to the image forming apparatus of the invention, there is provided the image forming apparatus further comprising the composition requirement (A011), (A011) the position reading original position detection storage section (C2F) having corner point coordinate detection storage section (C2F1) for detecting and storing the coordinates of four corner points P1 to P4 of the position reading original image from the page memory (C2C1), and position reading original position calculation storage section (C2F2) for calculating and storing the position Xa of the position reading original in the scan direction along the Y axis, and the position Ya in the Y-axis direction along the X axis from the point coordinates {P1(X1,Y1), P2(X2,Y2), P3(X3,Y3), P4(X4,Y4)} stored in the corner point coordinate detection storage section (C2F1), where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction, the coordinates (X0, Y0) at an upstream end in the scan direction and the sub scan direction are the X-axis and Y-axis coordinates of an origin (X0, Y0)=(0,0), a position P1 is the upstream end in the scan direction and the sub scan direction of the area storing "d1" that is the position reading original image stored in the page memory (C2C1), a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of the points P1 to P4 are P1(X1,Y1), P2(X2,Y2), P3(X3,Y3) and P4(X4,Y4), and the coordinates X1 to X4 and Y1 to Y4 are the number of light receiving elements from the origin (0,0) to the points P1 to P4 in the scan direction (X axis direction) and the sub scan direction (Y axis direction).

In this case, the corner point coordinate detection storage section (C2F1) of the position reading original position detection storage section (C2F) detects and stores the coordinates of four corner points P1 to P4 of the position reading original image from the page memory (C2C1), where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction, the coordinates (X0, Y0) at an upstream end in the scan direction and the sub scan direction are the X-axis and Y-axis coordinates of an origin (X0, Y0)=(0,0), a position P1 is the upstream end in the scan direction and the sub scan direction of the area storing "d1" that is the position reading original image stored in the page memory (C2C1), a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of the points P1 to P4 are P1(X1,Y1), P2(X2,Y2), P3(X3,Y3) and P4(X4,Y4), and the coordinates X1 to X4 and Y1 to Y4 are the number of light receiving elements from the origin (0,0) to the points P1 to P4 in the scan direction (X axis direction) and the sub scan direction (Y axis direction).

The position reading original position calculation storage section (C2F2) calculates and stores the position Xa of the position reading original in the scan direction along the Y axis, and the position Ya in the Y-axis direction along the X axis from the point coordinates {P1(X1,Y1), P2(X2,Y2), P3(X3,Y3), P4(X4,Y4)} stored in the corner point coordinate detection storage section (C2F1).

According to the image forming apparatus of the invention, there is provided the image forming apparatus comprising the composition requirement (A012), (A012) the position reading original position calculation storage section (C2F2) for calculating and storing the Xa and Ya in accordance with the following expressions, $$Xa=\{(X1+X3)/2\} \quad (1)$$

$$Ya=\{(Y1+Y2)/2\} \quad (2)$$

In this case, the position reading original position calculation storage section (C2F2) calculates and stores the Xa and Ya in accordance with the following expressions, $$Xa=\{(X1+X3)/2\} \quad (1)$$

$$Ya=\{(Y1+Y2)/2\} \quad (2)$$

According to the image forming apparatus of the invention, there is provided the image forming apparatus comprising the composition requirements (A013) to (A015), (A013) position reading original size detection storage section (C2I) for detecting and storing the length Lx of the position reading original in the scan direction, and the length Ly in the Y-axis direction, based on the area storing "d0" that is background image stored in the page memory (C2C1) and the area storing "d1" that is position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction;

(A014) position reading original regular size reference length storage section (C2J) for storing a reference length Lx0 of the position reading original consisting of a sheet of regular size in the scan direction or a reference length Ly0 in the sub scan direction; and (A015) original magnification calculation storage section (C2K) for calculating and storing a scan direction magnification (Lx/Lx0) or a sub scan direction magnification (Ly/Ly0) that is the detected length Lx or Ly of the position reading original with respect to the reference length Lx0 or Ly0, based on the reference length Lx0 or Ly0 of the position reading original stored in the position reading original regular size reference length storage section (C2J), and the detected length Lx or Ly of the position reading original detected and stored by the position reading original size detection storage section (C2I).

In this case, the position reading original size detection storage section (C2I) detects and stores the length Lx of the position reading original in the scan direction, and the length Ly in the Y-axis direction, based on the area storing "d0" that is background image stored in the page memory (C2C1) and the area storing "d1" that is position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction.

The position reading original regular size reference length storage section (C2J) stores a reference length Lx0 of the position reading original consisting of a sheet of regular size in the scan direction or a reference length Ly0 in the sub scan direction.

The original magnification calculation storage section (C2K) calculates and stores a scan direction magnification (Lx/Lx0) or a sub scan direction magnification (Ly/Ly0) that is the detected length Lx or Ly of the position reading original with respect to the reference length Lx0 or Ly0, based on the reference length Lx0 or Ly0 of the position reading original stored in the position reading original regular size reference length storage section (C2J), and the detected length Lx or Ly of the position reading original detected and stored by the position reading original size detection storage section (C2I).

According to the image forming apparatus of the invention, there is provided the image apparatus comprising the composition requirement (A016), (A016) the position reading original size detection storage section (C2I) having corner point coordinate detection storage section (C2I1) for detecting and storing the coordinates of four corner points P1 to P4 of the position reading original image from the page memory (C2C1), and position reading original size calculation storage section (C2I2) for calculating and storing the length Lx of the position reading original in the scan direction and the length Ly in the sub scan direction from the point coordinates {P1(X1,Y1), P2(X2,Y2), P3(X3,Y3), P4(X4,Y4)} stored in the corner point coordinate detection storage section (C2I1), where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction, the coordinates (X0, Y0) at an upstream end in the scan direction and the sub scan direction are the X-axis and Y-axis coordinates of an origin (X0, Y0)=(0,0), a position P1 is the upstream end in the scan direction and the sub scan direction of the area storing "d1" that is the position reading original image stored in the page memory (C2C1), a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of the points P1 to P4 are P1(X1,Y1), P2(X2,Y2), P3(X3,Y3) and P4(X4,Y4), and the coordinates X1 to X4 and Y1 to Y4 are the number of light receiving elements from the origin (0,0) to the points P1 to P4 in the scan direction (X axis direction) and the sub scan direction (Y axis direction).

In this case, the corner point coordinate detection storage section (C2I1) of the position reading original size detection storage section (C2I) detects and stores the coordinates of four corner points P1 to P4 of the position reading original image from the page memory (C2C1), where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction, the coordinates (X0, Y0) at an upstream end in the scan direction and the sub scan direction are the X-axis and Y-axis coordinates of an origin (X0, Y0)=(0,0), a position P1 is the upstream end in the scan direction and the sub scan direction of the area storing "d1" that is the position reading original image stored in the page memory (C2C1), a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of the points P1 to P4 are P1(X1,Y1), P2(X2,Y2), P3(X3,Y3) and P4(X4,Y4), and the coordinates X1 to X4 and Y1 to Y4 are the number of light receiving elements from the origin (0,0) to the points P1 to P4 in the scan direction (X axis direction) and the sub scan direction (Y axis direction).

The position reading original size calculation section (C2I2) of the position reading original size detection storage section (C2I) calculates and stores the length Lx of the position reading original in the scan direction and the length Ly in the sub scan direction from the point coordinates {P1(X1,Y1), P2(X2,Y2), P3(X3,Y3), P4(X4,Y4)} stored in the corner point coordinate detection storage section (C2I1).

According to the image forming apparatus of the invention, there is provided the image forming apparatus comprising the composition requirement (A017) in the form 6 of the third invention, (A017) the position reading original size calculation storage section (C2I2) for calculating and storing the Lx and Ly in accordance with the following expressions (3) and (4), $$Lx=\{(X2+X4)-(X1+X3)\}/2 \quad (3)$$

$$Ly=\{(Y3+Y4)-(Y1+Y2)\}/2 \quad (4)$$

In this case, the position reading original size calculation storage section (C2I2) calculates and stores the Lx and Ly in accordance with the following expressions (3) and (4), $$Lx=\{(X2+X4)-(X1+X3)\}/2 \quad (3)$$

$$Ly=\{(Y3+Y4)-(Y1+Y2)\}/2 \quad (4)$$

According to the image forming apparatus of the invention, there is provided the image apparatus comprising the composition requirement (A018), (A018) position reading original skew detection storage section (C2L) for detecting and storing, as a skew amount, an inclination angle θ of an upper edge of the position reading original in the sub scan direction with respect to the X axis, or an inclination angle θ of an upstream edge of the position reading original in the scan direction with respect to the Y axis, based on the area storing "d0" that is the background image stored in the page memory (C2C1) and the area storing "d1" that is the position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction.

In this case, the position reading original skew detection storage section (C2L) detects and stores, as a skew amount, an inclination angle θ of an upper edge of the position reading original in the sub scan direction with respect to the X axis, or an inclination angle θ of an upstream edge of the position reading original in the scan direction with respect to the Y axis, based on the area storing "d0" that is the background image stored in the page memory (C2C1) and the area storing "d1" that is the position reading original image, where the X axis is the straight line extending in the scan direction along the upstream edge in the sub scan direction of the area storing "d0" that is the background image stored in the page memory (C2C1), and the Y axis is the straight line extending in the sub scan direction along the upstream edge in the scan direction.

According to the image forming apparatus of the invention, there is provided the image apparatus comprising the composition requirement (A019), (A019) measured value display section (C2M) for displaying, on a display part (UI1) of a user interface (UI), a misregistration amount of the position reading original in the scan direction (sheet width direction) with respect to the reference position, a misregistration amount in the sub scan direction (sheet feeding direction) with respect to the reference position, a magnification of the length in the scan direction with respect to the reference value, a magnification of the length in the sub scan direction with respect to the reference value, or a skew amount, which is measured in a measurement mode performed by the measurement mode execution section.

In this case, the measured value display section (C2M) displays, on a display part (UI1) of a user interface (UI), a misregistration amount of the position reading original in the scan direction (sheet width direction) with respect to the reference position, a misregistration amount in the sub scan direction (sheet feeding direction) with respect to the reference position, a magnification of the length in the scan direction with respect to the reference value, a magnification of the length in the sub scan direction with respect to the reference value, or a skew amount, which is measured in a measurement mode performed by the measurement mode execution section.

According to the image forming apparatus of the invention, there is provided the image apparatus comprising the composition requirements (B09) and (B010), (B09) an after-shipment first power-on discrimination flag (FL) for storing data discriminating the after-shipment first power-on at the time of shipping the image forming apparatus; and (B010) the measurement mode start section (C2D) for automatically starting the operation of the misregistration measurement mode by the measurement mode execution section (C2D), if the after-shipment first power-on discrimination flag (FL) stores the data of after-shipment first power-on, when the image forming apparatus is powered on.

In this case, the after-shipment first power-on discrimination flag (FL) stores data discriminating the after-shipment first power-on at the time of shipping the image forming apparatus.

The measurement mode start section (C2D) automatically starts the operation of the misregistration measurement mode by the measurement mode execution section (C2D), if the after-shipment first power-on discrimination flag (FL) stores the data of after-shipment first power-on, when the image forming apparatus is powered on.

According to the image forming apparatus of the invention, there is provided the image apparatus comprising the composition requirement (B011), (B011) measurement mode time original feeding start time setting section (C2E1) for setting an original feeding start time (t2) in the measurement mode to be delayed by a set delay time (t2−t1) from the original feeding start time (t1) for an image reading start time (t4) (see FIG. 4) set at the normal image formation time to allow the position reading original to arrive at the original reading position (PG1) after starting to read the position reading original.

In this case, the measurement mode time original feeding start time setting section (C2E1) sets the original feeding start time (t2) in the measurement mode to be delayed by a set delay time (t2−t1) from the original feeding start time (t1) for the image reading start time (t4) (see FIG. 4) set at the normal image formation time, so that the position reading original can arrive at the original reading position (PG1) at the time (t5) after the reading start time (t4) of the position reading original. Accordingly, the leading edge of the position reading original is securely read in the measurement mode.

The paper powder removal member of the invention achieves the following effect (E01).

(E01) the misregistration of the original at the original reading position, the size magnification of the original with respect to the reference size or the skew can be easily measured employing the normal original with the white periphery, but not the special original.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-267781 filed on Sep. 15, 2005 including specification, claims, drawings, and abstract is incorporated herein by reference in its entirely.

What is claimed is:

1. An automatic original feeding device comprising:
an original paper feed tray that loads an original to read an image, the original paper feed tray being supported on an upper face of a platen glass for an image reader that reads an image of the original passing through an original reading position set along a straight line on the upper face of the platen glass disposed at an upper end; an original paper output tray;
original feeding members feeding sequentially the original laid on the original paper feed tray to the original reading position and the original paper output tray; and
a strip sheet attaching part attaching detachably a strip colored sheet, the strip sheet attaching part provided in a back platen member disposed in a portion opposed to the original reading position under a condition that the sheet attaching part is supported on the upper face of the platen glass.

2. An image reader comprising:
a platen glass disposed at an upper end; an original illuminating member illuminating an original passing through an original reading position set along a straight line on an upper face of the platen glass;
a CCD having a number of light receiving elements arranged along the straight line to detect a quantity of reflected light from the original;
a read image creation section creating digital data of a read image by converting a quantity of detected light for each light receiving element in the CCD from analog to digital form and
a read image storage memory that stores the read image created by the read image creation section; and
a page memory that stores the image of one sheet of a position reading original, defined by a position reading sheet with regular size and white ground, as the image data of one page,
wherein the CCD reads an image of a position reading original, when the position reading original fed by an automatic original feeding device passes through the original reading position in a state where a strip colored sheet is detachably attached in the strip sheet attaching part, the automatic original feeding device having a strip sheet attaching part provided in a back platen member disposed in a portion opposed to the original reading position in a state where it is supported on the upper face of the platen glass, an original paper feed tray, an original paper output tray, and original feeding members for sequentially feeding the original laid on the original paper feed tray to the original reading position and the original paper output tray, and
wherein the read image creation section creates the entire image of the read position reading original with the colored sheet serving as a background image, where "d0" is the digital value of the quantity of detected light for the light receiving element that detects the reflected light from the colored sheet becoming the background image and "d1" is the digital value of the quantity of detected light for the light receiving element that detects the reflected light from the position reading original becoming the position reading original image by binarizing the quantity of detected light for each light receiving element in the CCD that reads the position reading original passing through the original reading position against the background of the colored sheet at a predetermined threshold as the boundary.

3. The image reader according to claim 2, the digital values "d0" and "d1" are set such that "d0"="0" and "d1"="1".

4. The image reader according to claim 2, further comprising:
a position reading original position detection storage section that detects and stores a position Xa of the position reading original in the scan direction along the Y axis, and a position Ya in the Y-axis direction along the X axis, based on an area storing "d0" that is background image stored in the page memory and an area storing "d1" that is position reading original image, where the X axis is the straight line extending in the scan direction along the upstream edge in the sub scan direction of the area storing "d0" that is the background image stored in the page memory, and the Y axis is the straight line extending in the sub scan direction along the upstream edge in the scan direction;

a position reading original reference position storage section that stores a reference position Xa0 of the position reading original in the scan direction along the Y axis and a reference position Ya0 in the Y-axis direction along the X axis; and a misregistration amount calculation storage section that calculates and stores a misregistration amount (Xa−Xa0) or (Ya−Ya0) of the detected position Xa or Ya of the position reading original from the reference position Xa0 or Ya0, based on the reference position Xa0 or Ya0 of the position reading original stored in the position reading original reference position storage section, and the detected position Xa or Ya of the position reading original detected and stored by the position reading original position detection storage section.

5. An image forming apparatus comprising:

an image reader having a platen glass disposed at an upper end, an original illuminating member that illuminates an original passing through an original reading position set along a straight line on an upper face of the platen glass, and a CCD having a number of light receiving elements arranged along the straight line to detect a quantity of reflected light from the original;

an automatic original feeding device having a strip sheet attaching part for detachably attaching a strip colored sheet, the strip attaching part provided in a back platen member disposed in a portion opposed to the original reading position in a state where it is supported on the upper face of the platen glass, an original paper feed tray for laying the original to read the image, an original paper output tray, and original feeding members that sequentially feeds the original laid on the original paper feed tray to the original reading position and the original paper output tray;

an image recording apparatus that records the image read by the image reader on a recording sheet and outputting the sheet;

a misregistration measurement mode execution section that performs a misregistration measurement mode having an operation of measuring a misregistration amount of the position reading original in the scan direction with respect to the reference position, a misregistration amount in the sub scan direction with respect to the reference position, a magnification of the length in the scan direction with respect to the reference value, a magnification of the length in the sub scan direction with respect to one of the reference value and a skew amount, based on the read image of the image reader, when the position reading original defined by a position reading sheet of regular size and white ground is fed by the automatic original feeding device in a state where the strip colored sheet is attached;

a measurement mode start section that starts the operation of the misregistration measurement mode by the misregistration measurement mode execution section;

the CCD that reads an image of the position reading original, when the position reading original defined by the position reading sheet of regular size and white ground fed by the automatic original feeding device passes through the original reading position in a state where the automatic original feeding device detachably attaches a strip colored sheet in the strip sheet attaching part; and a read image creation section that creates the entire image of the read position reading original with the colored sheet serving as a background image, where "d0" is the digital value of the quantity of detected light for the light receiving element that detects the reflected light from the colored sheet becoming the background image and "d1" is the digital value of the quantity of detected light for the light receiving element that detects the reflected light from the position reading original becoming the position reading original image by binarizing the quantity of detected light for each light receiving element in the CCD that reads the position reading original passing through the original reading position against the background of the colored sheet at a predetermined threshold serving as the boundary in performing the measurement mode; and a page memory that stores the image of one sheet of the position reading original created by the read image creation section as the image data of one page.

6. The image forming apparatus according to claim 5, the digital values "d0" and "d1" are set such that "d0"="0" and "d1"="1".

7. The image forming apparatus according to claim 5, further comprising:

a position reading original position detection storage section that detects and storing a position Xa of the position reading original in the scan direction along the Y axis, and a position Ya in the Y-axis direction along the X axis, based on an area storing "d0" that is background image stored in the page memory and an area storing "d1" that is position reading original image, where the X axis is the straight line extending in the scan direction along the upstream edge in the sub scan direction in the area storing "d0" that is the background image stored in the page memory, and the Y axis is the straight line extending in the sub scan direction along the upstream edge in the scan direction;

a position reading original reference position storage section that stores one of a reference position Xa0 of the position reading original in the scan direction along the Y axis and a reference position Ya0 in the Y-axis direction along the X axis; and a misregistration amount calculation storage section that calculates and stores a misregistration amount (Xa−Xa0) or (Ya−Ya0) of the detected position Xa or Ya of the position reading original from the reference position Xa0 or Ya0, based on the reference position Xa0 or Ya0 of the position reading original stored in the position reading original reference position storage section, and the detected position Xa or Ya of the position reading original detected and stored by the position reading original position detection storage section.

8. The image forming apparatus according to claim 7, the position reading original position detection storage section includes:

a corner point coordinate detection storage section that detects and stores the coordinates of four corner points P1 to P4 of the position reading original image from the page memory; and a position reading original position calculation storage section that calculates and stores the position Xa of the position reading original in the scan direction along the Y axis, and the position Ya in the Y-axis direction along the X axis from the point coordinates {P1(X1,Y1), P2(X2,Y2), P3(X3,Y3), P4(X4,Y4)} stored in the corner point coordinate detection storage section, where the X axis is the straight line extending in the scan direction along the upstream edge in the sub scan direction of the area storing "d0" that is the background image stored in the page memory, and the Y axis is the straight line extending in the sub scan direction along the upstream edge in the scan direction, the coordinates (X0, Y0) at an upstream end in the scan direction and the sub scan direction are the X-axis and Y-axis coordinates of an origin (X0, Y0)=(0,0), a position P1 is the upstream end in the scan direction and the sub scan direction of the area storing "d1" that is the position reading original image stored in the page memory, a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of the points P1 to P4 are Pl(X1,Y1), P2(X2,Y2), P3(X3,Y3) and P4(X4,Y4), and the coordinates X1 to X4 and Y1 to Y4 are the number of light receiving elements from the origin (0,0) to the points P1 to P4 in the scan direction and the sub scan direction.

9. The image forming apparatus according to claim 8, wherein the position reading original position calculation storage section calculates and stores the Xa and Ya in accordance with the following expressions, $$Xa=\{(X1+X3)/2\} \quad (1)$$

$$Ya=\{(Y1+Y2)/2\} \quad (2)$$

10. The image forming apparatus according to claim 5, further comprising:
   a position reading original size detection storage section detects and stores the length Lx of the position reading original in the scan direction, and the length Ly in the Y-axis direction, based on the area storing "d0" that is background image stored in the page memory and the area storing "d1" that is position reading original image, where the X axis is the straight line extending in the scan direction along the upstream edge in the sub scan direction of the area storing "d0" that is the background image stored in the page memory, and the Y axis is the straight line extending in the sub scan direction along the upstream edge in the scan direction;
   a position reading original regular size reference length storage section that stores one of a reference length Lx0 of the position reading original defined by a sheet of regular size in the scan direction and a reference length Ly0 in the sub scan direction; and
   an original magnification calculation storage section that calculates and stores one of a scan direction magnification (Lx/Lx0) and a sub scan direction magnification (Ly/Ly0) that is the detected length Lx or Ly of the position reading original with respect to the reference length Lx0 or LyO, based on the reference length Lx0 or Ly0 of the position reading original stored in the position reading-original regular size reference length storage section, and the detected length Lx or Ly of the position reading original detected and stored by the position reading original size detection storage section.

11. The image forming apparatus according to claim 10, wherein the position reading original size detection storage section includes:
   a corner point coordinate detection storage section that detects and stores the coordinates of four corner points P1 to P4 of the position reading original image from the page memory; and
   a position reading original size calculation storage section that calculates and stores the length Lx of the position reading original in the scan direction and the length Ly in the sub scan direction from the point coordinates {P1 (X1,Y1), P2(X2,Y2), P3(X3,Y3), P4(X4,Y4)} stored in the corner point coordinate detection storage section,
   where the X axis is the straight line extending in the scan direction along the upstream edge in the sub scan direction of the area storing "d0" that is the background image stored in the page memory, and the Y axis is the straight line extending in the sub scan direction along the upstream edge in the scan direction, the coordinates (X0, Y0) at an upstream end in the scan direction and the sub scan direction are the X-axis and Y-axis coordinates of an origin (X0, Y0)=(0,0), a position P1 is the upstream end in the scan direction and the sub scan direction of the area storing "d1" that is the position reading original image stored in the page memory, a position P2 is the downstream end in the scan direction and the upstream end in the sub scan direction, a point P3 is the upstream end in the scan direction and the downstream end in the sub scan direction, a point P4 is the downstream end in the scan direction and the sub scan direction, the coordinates of the points P1 to P4 are P1(X1,Y1), P2(X2, Y2), P3(X3,Y3) and P4 (X4,Y4), and the coordinates X1 to X4 and Yl to Y4 are the number of light receiving elements from the origin (0,0) to the points P1 to P4 in the scan direction (X axis direction) and the sub scan direction (Y axis direction).

12. The image forming apparatus according to claim 11, wherein the position reading original size calculation storage section for calculating and storing the Lx and Ly in accordance with the following expressions (3) and (4), $$Lx=\{(X2+X4)-(X1+X3)\}/2 \quad (3)$$

$$Ly=\{(Y3+Y4)-(Y1+Y2)\}/2 \quad (4)$$

13. The image forming apparatus according to claim 5, further comprising:
   a position reading original skew detection storage section that detects and stores a skew amount corresponding to an inclination angle .theta. of an upper edge of the position reading original in the sub scan direction with respect to the X axis, or an inclination angle .theta. of an upstream edge of the position reading original in the scan direction with respect to the Y axis, based on the area storing "d0" that is the background image stored in the page memory and the area storing "d1" that is the position reading original image,
   wherein the X axis is the straight line extending in the scan direction along the upstream edge in the sub scan direction of the area storing "d0" that is the background image stored in the page memory, and the Y axis is the straight line extending in the sub scan direction along the upstream edge in the scan direction.

14. The image forming apparatus according to claim 5, further comprising
   a measured value display section that displays, on a display part of a user interface, a misregistration amount of the position reading original in the scan direction with respect to the reference position, a misregistration amount in the sub scan direction with respect to the reference position, a magnification of the length in the scan direction with respect to the reference value, a magnification of the length in the sub scan direction with respect to the reference value, or a skew amount, which is measured in a measurement mode performed by the measurement mode execution section.

15. The image forming apparatus according to claim 5, further comprising:

an after-shipment first power-on discrimination flag that stores data discriminating the after-shipment first power-on at the time of shipping the image forming apparatus, wherein the measurement mode start section starts automatically the operation of the misregistration measurement mode by the measurement mode execution section when the after-shipment first power-on discrimination flag stores the data of after-shipment first power-on when the image forming apparatus is powered on.

16. The image forming apparatus according to claim 5, further comprising a measurement mode time original feeding start time setting section that setting an original feeding start time in the measurement mode to be delayed by a set delay time from the original feeding start time for an image reading start time set at the normal image formation time to allow the position reading original to arrive at the original reading position after starting to read the position reading original.

17. An automatic original paper feeding device comprising:

an image reader that reads an image on an original paper; a platen glass being disposed on an upper end of the image reader, the original paper passing through an original reading position set along a straight line on an upper face of the platen glass;

an original paper feeding tray that loads the original paper and being supported on an upper face of the platen glass;

an original paper output tray;

an original paper conveyer that sequentially conveys the original paper laid on the original paper feeding tray to the original reading position and to the original paper output tray; and a strip sheet attaching part attaching detachably a strip colored sheet, the strip sheet attaching part provided in a back platen member disposed in a portion opposed to the original reading position under a condition that the sheet attaching part is supported on the upper face of the platen glass.

18. An image reader comprising:

a platen glass disposed at an upper end of the image reader;

an original paper illuminating member that illuminates an original paper passing through an original reading position set along a straight line on an upper face of the platen glass;

a CCD having a light receiving element arranged along the straight line to detect a quantity of reflected light from the original paper, the CCD reading an image of the original paper for reading an original reading position when the original paper for reading the original reading position passes through the original reading position, the original paper for reading the original reading position being a sheet having regular size and white ground and fed by an automatic original paper feeding device to which a strip colored sheet detachably attached in a strip sheet attaching part of the automatic original paper feeding device;

a read image creating section that creates digital data of a read image by converting a quantity of reflected light detected by the light receiving element in the CCD from analog to digital form, and creates the image of the original paper for reading an original reading position, serving the colored sheet as a background image, by binarizing the quantity of reflected light of the original paper for reading an original reading position detected by the light receiving element in the CCD at a predetermined threshold as the boundary, and setting the digital value of the quantity of reflected light from the colored sheet as "d0" and setting the digital value of the quantity of reflected light from the original paper for reading the original reading position as "d1";

a read image storage memory that stores the read image created by the read image creating section; and a page memory that stores the image of one sheet of the original paper for reading the original reading position as the image data of one page.

* * * * *